United States Patent
Xia et al.

(10) Patent No.: US 12,488,772 B2
(45) Date of Patent: Dec. 2, 2025

(54) SYSTEM AND METHOD OF GPT DRIVEN CINEMATIC MUSIC GENERATION THROUGH TEXT PROCESSING

(71) Applicant: Mohamed bin Zayed University of Artificial Intelligence, Abu Dhabi (AE)

(72) Inventors: Gus Xia, Abu Dhabi (AE); Muhammad Taimoor Haseeb, Abu Dhabi (AE); Ahmad Hammoudeh, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 18/903,957

(22) Filed: Oct. 1, 2024

(65) Prior Publication Data

US 2025/0252943 A1    Aug. 7, 2025

Related U.S. Application Data

(60) Provisional application No. 63/550,837, filed on Feb. 7, 2024.

(51) Int. Cl.
*G10H 1/00* (2006.01)
*G06V 10/70* (2022.01)
(Continued)

(52) U.S. Cl.
CPC .......... *G10H 1/0025* (2013.01); *G06V 10/70* (2022.01); *G06V 20/35* (2022.01); *G06V 20/47* (2022.01);
(Continued)

(58) Field of Classification Search
CPC .......... G10H 1/0025; G10H 2210/021; G06V 10/70; G06V 20/35; G06V 20/47; G10L 15/26
(Continued)

(56) References Cited

U.S. PATENT DOCUMENTS

| 9,142,201 B2 * | 9/2015 | Good ................. G10H 1/18 |
| 12,300,272 B2 * | 5/2025 | Dontcheva ........... G11B 27/02 |

(Continued)

FOREIGN PATENT DOCUMENTS

| CN | 116959393 B | 12/2023 |
| CN | 117312499 A | 12/2023 |

OTHER PUBLICATIONS

Jaeyong Kang, et al., "Video2Music: Suitable Music Generation from Videos Using an Affective Multimodal Transformer Model", arXiv:2311.00968v2., Mar. 4, 2024.
(Continued)

*Primary Examiner* — Helen Shibru
(74) *Attorney, Agent, or Firm* — Oblon, McClelland, Maier & Neustadt, L.L.P.

(57) ABSTRACT

A method, and non-transitory computer readable medium that perform a method for generating background music tailored for a movie scene, in a smart audio-visual display device. The method includes receiving video of the movie scene. Processing circuitry detects speech signals in the movie scene and extracts visual information and, when speech signals are detected, spoken dialogue from the movie scene. Descriptive text is generated from the visual information. Emotion categories are detected based on the visual information. The spoken dialogue is transcribed into transcribed text. A large language model (LLM) translates the descriptive text, emotion categories and transcribed text into text-based low-level musical instrument conditions. A text-to-music model is guided, by the low-level musical instrument conditions, to generate audio tokens that resonate with the movie scene. Music signals are output in accordance with the audio tokens in synchronism with the movie scene.

20 Claims, 45 Drawing Sheets

(51) Int. Cl.
   *G06V 20/00* (2022.01)
   *G06V 20/40* (2022.01)
   *G10L 15/26* (2006.01)

(52) U.S. Cl.
   CPC ........ *G10L 15/26* (2013.01); *G10H 2210/021* (2013.01)

(58) Field of Classification Search
   USPC .......................................................... 386/248
   See application file for complete search history.

(56) References Cited

U.S. PATENT DOCUMENTS

| | | | |
|---|---|---|---|
| 12,346,367 B2* | 7/2025 | O'Neill | G06F 16/483 |
| 12,367,238 B2* | 7/2025 | Dontcheva | G06F 16/738 |
| 2023/0067387 A1* | 3/2023 | Wang | G06F 40/30 |
| 2025/0119606 A1* | 4/2025 | Hou | H04N 21/8456 |
| 2025/0245869 A1* | 7/2025 | Kalish | G06N 20/00 |

OTHER PUBLICATIONS

Aayush Mittal, "Text-to-Music Generative AI: Stability Audio, Google's MusicLM and More", Unite AI, Sep. 25, 2023.
Zheng Lian, et al., "GPT-4V with Emotion: A Zero-shot Benchmark for Generalized Emotion Recognition", arXiv:2312.04293v2, Feb. 3, 2024.

* cited by examiner

Given the following image captions from a video: 1) the sun is setting behind a tree in the dark 2) the sun is setting over the horizon in the distance 3) the sun is setting over the horizon in the distance 4) the lion king wallpapers the lion king wallpapers the lion king wallpapers the lion king wallpapers the lion king wallpapers 5) the lion king, lion king, lion king 2, lion king2 wallpaper, lion king wallpaper, lion king wallpaper hd wallpaper 6) a rhinocerosis standing in the grass with an orange sky in the background 7) the lion king, lion king, lion king 2, lion king 2 wallpaper, lion king 2 wallpaper, lion king 2 wallpaper 8) disney's the lion king the lion, the witch and the Wardrobe 9) thelion king the lion king the lion king the lion king the lion king thelion king the lion king the lion king the lion king 10) a group of meerkats standing on top of a hill 11) the lion king the lion king the lion king the lion king the lion king the lion king the lion king 12) a lion stands on top of a hill with an orange sky in the background 13) a painting of two storks standing in the water 14) an animated image of a large bird standing on the water 15) an animated image of a bird sitting on a branch 16) a painting of two birds flying over a body of water 17) an animated image of a large bird flying over a body of water 18) a waterfall with birds flying over it at sunset 19) a black background with an airplane flying in the air 20) a black background with an airplane flying in the air

FIG. 5A and the following transcriptions: 1) Naaan simpwenyaamabaghi ti baba (SPEAKER_00) 2) Si ji ko mou (SPEAKER_00) 3) Venyaa mabogh(SPEAKER_00) 4) Venyaa mabogh (SPEAKER_00) 5) Naaan simpwenyaa mabaghi tibaba (SPEAKER_02) 6) Si ji ko mou (SPEAKER_01) 7) Venyaa mabogh (SPEAKER_01) 8) Hai baba (SPEAKER_01) 9) Venyaa mabogh (SPEAKER_01) 10) Si yo mou baba(SPEAKER_03) 11) Venyaa mabogh (SPEAKER_03) 12) Venyaa mabogh(SPEAKER_03) and given that the sentiments of the video are: calm 46.67% sad33.33% inspiring 20.00%

FIG. 5B

Describe the music that would fit such a video. Your output will be fed to a text to music model. To help you out, here are someprompts that worked well with the model: 1) Pop dance track with catchymelodies, tropical percussion, and upbeat rhythms, perfect for the beach 2) classicreggae track with an electronic guitar solo 3) earthy tones, environmentallyconscious, ukulele-infused, harmonic, breezy, easygoing, organic instrumentation,gentle grooves 4) lofi slow bpm electro chill with organic samples 5) violins andsynths that inspire awe at the finiteness of life and the universe 6) 80s electronictrack with melodic synthesizers, catchy beat and groovy bass Give me only the description of the music without any explanation. Give me a single description.

FIG. 5C

Majestic African-inspired instrumentation with gentle percussions, soothing flutes, and melodic chants evoking the serenity of vast landscapes, intertwined with melancholic strings capturing moments of introspection, culminating in uplifting crescendos that inspire hope and awe.

FIG. 5D

Given the following image captions from a video: 1) a man and woman standing on the deck of a boat at sunset 2) a man and woman standing on the deck of a boat at sunset 3) a woman With red hair standing in front of a ship 4) a woman with red hair standing in front of a ship 5) leonardo dicaprio in titanic 6) leonardo dicaprio in 'the great gatsby' 7) a woman with red hair standing in front of a ship 8) a woman with red hair standing in front of a ship 9) leonardo dicaprio in 'titanic' 10) leonardo dicaprio in the movie titanic 11) a woman with red hair standing In front of a ship 12) a woman with red hair standing in front of a ship 13) a man and woman standing on the deck of a boat at sunset 14) a man and woman standing on the deck of a boat at sunset 15) a close up of a woman with red hair 16) a woman with red hair looking at a man 17) a man and a woman looking at each other in a scene from the movie titanic 18) leonardo dicaprio and mia farrow in titanic 19) a woman looking into the eyes of a man 20) a man and a woman are looking at each other 21) a man and a woman standing next to each other 22) leonardo dicaprio and meryl streep in titanic

FIG. 6A and the following transcriptions: 1) I said you might be after me. (SPEAKER_01) 2) Give me your hand. (SPEAKER_00) 3) Now close your eyes. (SPEAKER_00) 4) Go on. (SPEAKER_00) 5) Step up. (SPEAKER_00) 6) Now hold on to the railing. (SPEAKER_00) 7) Keep your eyes closed. (SPEAKER_00) and given that the sentiments of the video are: romantic 100.00%

FIG. 6B

Describe the music that would fit such a video. Your output will be fed to a text to music model. To help you out, here are some prompts that worked well with the model: 1) Pop dance track With catchy melodies, tropical percussion, and upbeat rhythms, perfect for the beach 2) classic reggae track with an electronic guitar solo 3) earthy tones, environmentally conscious, Ukulele infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 6C

Ethereal orchestral piece with soft piano undertones, interlaced with melancholic violin solos, reminiscent of historical romance. Very gentle harp plucks accentuate moments of intimacy, crescendos mirroring the ebb and flow of the sea. Haunting flute melodies interspersed, evoking the vastness of the ocean and the fragility of love. The backdrop is filled with soft, sweeping strings, building up to a powerful climax, capturing the essence of timeless romance and the breathtaking moments of connection between two souls. As the story unfolds, subtle choral harmonies emerge, giving depth and warmth, encapsulating the nostalgia and longing found in epic tales of love.

FIG. 6D

Given the following image captions from a video: 1) the sun is setting over the city of san francisco 2) a woman in lingerie standing in front of a crowd 3) a video of people dancing in a club 4) a group of people sitting at a table at night 5) a group of people standing around a table at night 6) a group of people sitting around a table at night 7) a young man sitting at a table in a dimly lit room 8) a young man sitting at a table in a dimly lit room 9) a group of people sitting around a table at night 10) a group of people sitting around a table at a bar 11) a young man sitting at a table in a dimly lit room 12) a young man is looking at the camera with his mouth open

FIG. 7A and the following transcriptions 1) I was crashing there for a little music conditions guide a text-bit while taking care of some things but she's done (Speaker_00) 2) for the summer so she's back in her parents place. (Speaker_00) 3) The homeless rock star Palazzo. (Speaker_00) 4) Alright (Speaker_00) 5) What's your plan for the summer?(SPEAKER_00) 6) Mark. (SPEAKER_00) and given that the Sentiments of the video are: excited 50.00% energetic 35.71% sensual 14.29%.

FIG. 7B

Describe the music that would fit such a video. Your output will be fed to a text to music model. To help you out, here are some prompts that worked well with the model: 1) Pop dance track with Catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 7C

Given the following image captions from a video: 1) a scene from a movie with two people walking near a castle wall 2) two women in spartan armor on a dirt road 3) two men are fighting in front of a building 4) an image of a woman with a spear in the dirt 5) a man and woman in roman clothes are looking at each other 6) two men in armor standing next to each other 7) two men are fighting with swords in the air 8) a scene from the movie romeo and juliet 9) two men in roman armor fighting in front of a castle 10) a man in roman armor running with a large shield 11) two men holding spears and shields in a field 12) two men in spartan armor fighting in front of a castle 13) two men in armor fighting in front of a castle 14) an old man is standing in front of a group of men 15) two people fighting in the middle of a field 16) two men in armor fighting in front of a castle 17) an image of a man with a sword in his hand 18) two men in spartan armor fighting each other 19) two men in roman armor fighting in front of a castle 20) two men dressed in roman armor are fighting in front of a wall 21) a man holding a sword in Front of a castle 22) an image of a man holding a sword in a field 23) two men in spartan armor fighting in front of a wall 24) an image of a man in armor holding a sword 25) an image of a Man in armor holding a sword.

FIG. 8A and the following transcriptions: 1) I (SPEAKER_00) 2) You (SPEAKER_00) and given that the sentiments of the video are: action 90.00% sad 5.00% afraid 5.00%.

FIG. 8B

Describe the music that would fit such a video. Your output will be fed to a text to music model. To help you out, here are some prompts that worked well with the model: 1) Pop dance track with catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro Chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 8C

Epic orchestral score with thundering drums, intense string sections, and a hint of melancholic flute, embodying the valor and tension of ancient battles and the tragic undertones of warrior confrontations, interspersed with moments of dramatic silence accentuating the weight of the conflict.

Given the following image captions from a video: 1) a black background with an airplane flying in the air 2) a black background with an airplane flying in the air 3) a black Background with an airplane flying in the air 4) two men in suits standing next to each other 5) two men in suits sitting next to each other 6) a man in a suit and tie talking to another man in a suit 7) two men in suits standing at a counter 8) two men in suits standing at a counter 9) two men in suits sitting at a counter 10) a man with a mustache in a purple suit and bow tie 11) a man in a purple suit and bow tie 12) a man in a purple suit with a moustache and bow tie 13) a man in a purple suit and bow tie is looking away from the camera 14) a blurry image of an orange door with a sign on it 15) a man with glasses standing in front of a mirror 16) a man with glasses and a mustache is standing in front of a door 17) a man with a mustache and glasses is smoking a pipe 18) a man in a suit and tie smoking a pipe 19) a man sitting on a couch in an orange room 20) a man sitting on a couch in an orange room 21) a man sitting on a chair in an orange room 22) a man standing at the front desk of a hotel 23) a man standing at the top of a set of stairs 24) a man in a suit standing at the top of a set of stairs 25) the front page of a newspaper with the words immigrant claims fortune 26) the front page of a newspaper with the words immigrant claims fortune 27) the front page of a newspaper with the words immigrant claims fortune

FIG. 9A and the following transcriptions: 1) Who's this interesting old fellow? (SPEAKER_02) 2) I inquired of Monsieur Jean. (SPEAKER_02) 3) To my surprise, he was distinctly taken aback. (SPEAKER_02) 4) Don't you know? He asked. (SPEAKER_01) 5) Don't you recognize him? (SPEAKER_01) 6) He did look familiar. (SPEAKER_01) 7) That's Mr. Mustafa himself. He arrived early this morning. (SPEAKER_00) 8)This name will no doubt be familiar to the more Seasoned persons among you. (SPEAKER_02) 9) Mr. Zero Mustafa was, at one time, the richest man Zobrovka (SPEAKER_02) and given that the statements of the video are surprised 50.00% action 36.36% neutral 13.64%.

FIG. 9B

Describe the music that would fit such a video. Your output will be fed to a text to music model. 1) Pop dance track with catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 9C

Orchestral suspense track with rich strings, dramatic brass sections, and subtle jazz undertones, capturing the essence of intrigue and vintage allure.

FIG. 9D

Given the following image captions from a video: 1) a pink flag on top of a pole in front of buildings 2) a pink flag is flying in the air in front of buildings 3) a pink flag on top of a pole with buildings in the background 4) the top of a building with a clock on it 5) a building with windows lit up at night 6) a taxi is driving down a city street 7) three young people sitting at a table in front of candles 8) three young people sitting at a table in front of candles 9) three young people sitting at a table in front of candles 10) a man in a suit sitting at a table with red chairs 11) a man in a suit sitting at a table with red chairs 12) a man in a suit sitting at a table with red chairs 13) three young people sitting at a table in a room 14) three young people sitting at a table in front of candles 15) three young people sitting at a table in front of candles 16) a man in a suit sitting at a table with red chairs 17) a man in a suit sitting at a table with red chairs 18) a man in a suit sitting at a table with red chairs 19) three children sitting at a table in front of candles 20) three young people sitting at a table in front of candles 21) three young people sitting at a table in front of candles

FIG. 10A and the following transcriptions: 1) Lieutenant Baum bought the house on Archer Avenue in the winter of his 35th year. (SPEAKER_00) 2) Over the next decade, he and his wife had three children, and then they separated. (SPEAKER_00) 3) Are you getting divorced? (SPEAKER_04) 4) At the moment, no. (SPEAKER_01) 5) But it doesn't look good. (SPEAKER_02) 6) Do you still love us? (SPEAKER_03) 7) Of course I do. (SPEAKER_02) and given that the sentiments of the video are: neutral 42.86% angry 28.57% romantic 28.57%.

FIG. 10B

Describe the music that would fit such a video. Your output will be fed to a text to music model. To help you out, here are some prompts that worked well with the model: 1) Pop dance track with catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 10C

Melancholic piano melodies interspersed with soft string sections capturing moments of nostalgia and romance, juxtaposed with somber, heavier orchestral passages reflecting underlying tensions and conflicts, all flowing in a cinematic, evocative soundscape.

FIG. 10D

Given the following image captions from a video: 1) a yellow taxi cab is parked in front of a building 2) a yellow taxi cab driving down the street 3) a man in a suit and tie sitting in the back seat of a car 4) a man in a suit sitting in the back seat of a car 5) a yellow taxi cab is driving down the road 6) a man in a suit and tie riding a yellow taxi 9) a man in a suit and tie is running down the street 10) a woman is sitting in the driver's seat of a car 11) there is a close up of a person in a car 12) a man with a mustache is walking down the street 13) a man in a suit is walking down the street in front of a yellow taxi 14) a man in a suit and tie running down the street 15) a man is standing next to a taxi cab 16) a man is standing next to a yellow taxi cab 17) a man is hugging another man in front of a yellow taxi 18) two men are leaning on the hood of a taxi cab 19) two men are fighting in front of a yellow taxi 20) a man in a suit is getting out of a yellow taxi 21) a man is getting out of a yellow car 22) a man is being pushed out of a car by another man 23) a man in a car is being pushed by another man 24) a taxi cab with a man sitting in the driver's seat 25) a man standing next to a yellow taxi cab 26) a man in a suit and tie is running down the street 27) a man in a suit and tie is walking down the street 28) a man in a suit and tie running down the street 29) a man with a mustache is walking in front of a car 30) a man with a mustache is making a funny face 31) a man is walking down the street with a bag 32) an old car is driving down the street in front of a park 33) a man with a moustache standing in front of a building 34) a man in a black jacket is walking down the street 35) a group of people playing frisbee in a park 36) a man with a briefcase running through a park 37) a man and a woman walking down a path in a park 38) a man running across a grassy field with a suitcase

FIG. 11A and the following transcriptions: 1) Hey! (SPEAKER_00) 2) Hey! (SPEAKER_00) 3) Where they going? Come here! (SPEAKER_00) 4) Hey! No! (SPEAKER_00) 5) No, no, no, no! (SPEAKER_00) 6) Get my money! Get my money! (SPEAKER_00) 7) Please, please, please! (SPEAKER_00) 8) Please! (SPEAKER_00) 9) He should have paid you! He should have paid you! (SPEAKER_00) 10) I'm sorry! I'm so sorry! (SPEAKER_00) 11) I'm sorry! (SPEAKER_00) 12) Idiot! (SPEAKER_00) and given that the sentiments of the video are: action 94.44% sad 2.78% sympathetic 2.78%

FIG. 11B

Describe the music that would fit such a video. Your output will be fed to a text to music model. To help you out, here are some prompts that worked well with the model: 1) Pop dance track with catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 11C

Upbeat jazzy track with playful piano, whimsical woodwinds, and light percussion, creating a comedic and lighthearted atmosphere reminiscent of classic slapstick chase scenes.

FIG. 11D

Given the following image captions from a video: 1) a man in a black shirt is standing in front × of lights 2) a woman with long blonde hair standing in front of a door 3) a group of people dancing at a party 4) a group of people dancing at a party 5) a man in a black shirt talking to another man 6) a man in a black shirt talking to another man 7) a man and woman in a dark room looking at each other 8) a man and a woman are looking at each other 9) a man in a black shirt is talking to someone 10) a man in a black shirt talking to another man 11) a woman with her mouth open and a man looking at her 12) a woman is talking to a man in a dark room 13) pierce brosnan as james bond in goldeneye 007 14) a man in a black shirt smiling at the camera 15) a girl with long blonde hair is looking at a man in a dark room 16) a woman is talking to a man in a dark room 17) a man in a black shirt talking to another man at a party 18) a man in a black shirt is talking to someone 19) a man and a woman are looking at each other in a dark room 20) a woman is talking to a man in a dark room 21) a man in a black shirt talking to another man 22) a man in a black shirt talking to another man 23) a woman looking into the mirror with a man in front of her 24) a woman is talking to a man in a dark room 25) a man with his mouth open in front of a crowd 26) a man in black shirt talking to another man 27) amanda seyfried and amanda seyfried in the dark knight rises 28) a woman is talking to a man in a dark room 29) a man talking to another man in a crowded area 30) a group of people dancing at a party 31) a girl with long blonde hair in a dark room 32) a woman with long hair in a dark room 33) a group of people dancing in green shoes on a dance floor 34) a group of people dancing on a dance floor 35) a woman in a blue dress standing in front of a door 36) a woman in a blue dress standing in front of a doorway

FIG. 12A and the following transcriptions: 1) I know why I'm here. (SPEAKER_02) 2) Why didn't Donna tell me? (SPEAKER_02) 3) How long have you known I'm your father? (SPEAKER_02) 4) What? (SPEAKER_02) 5) Not long at all. (SPEAKER_02) 6) Sam, listen to me. (SPEAKER_02) 7) My mom doesn't know that I know. (SPEAKER_00) 8) So can we wait until after my wedding? (SPEAKER_00) 9) Who's giving you away tomorrow? (SPEAKER_00) 10) Nobody. (SPEAKER_00) 11) Wrong. I am. (SPEAKER_01) 12) Our secret till then. (SPEAKER_01) and given that the sentiments of the video are: surprised 66.67% angry 22.22% humorous 11.11%.

FIG. 12B

Describe the music that would fit such a video. Your output will be fed to a text to music model. To help you out, here are some prompts that worked well with the model: 1) Pop dance track with catchy melodies, tropical percussion, and upbeat rhythms, perfect for the beach 2) classic reggae track with an electronic guitar solo 3) earthy tones, environmentally conscious, ukulele-infused, harmonic, breezy, easygoing, organic instrumentation, gentle grooves 4) lofi slow bpm electro chill with organic samples 5) violins and synths that inspire awe at the finiteness of life and the universe 6) 80s electronic track with melodic synthesizers, catchy beat and groovy bass Give me only the description of the music without any explanation. Give me a single description.

FIG. 12C

Funky disco track with shimmering synthesizers, rhythmic bass grooves, playful orchestral strings, and light-hearted beats, punctuated by dramatic crescendos for moments of surprise, capturing the ambiance of a dance party while highlighting the humor and underlying emotions.

FIG. 12D

SYSTEM AND METHOD OF GPT DRIVEN CINEMATIC MUSIC GENERATION THROUGH TEXT PROCESSING

CROSS-REFERENCE TO RELATED APPLICATIONS

This application claims the benefit of priority to provisional application No. 63/550,837 filed Feb. 7, 2024, the entire contents of which are incorporated herein by reference.

STATEMENT REGARDING PRIOR DISCLOSURE BY THE INVENTORS

Aspects of the present disclosure are described in M. T. Haseeb, A. Hammoudeh and G. Xia, "GPT-4 Driven Cinematic Music Generation Through Text Processing," ICASSP 2024-2024 IEEE International Conference on Acoustics, Speech and Signal Processing (ICASSP), Seoul, Korea, Republic of, 2024, pp. 6995-6999, doi: 10.1109/ICASSP48485.2024.10447950 which is incorporated herein by reference in its entirety.

BACKGROUND

Technical Field

The present disclosure is directed to a multimodal framework, method and system to generate background music tailored to movie scenes. The framework is for a machine learning pipeline that takes a movie scene as input and generates a tailored audio music file.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cinema harnesses the power of music to evoke emotions and enhance storytelling, where the right background music can be the difference between a fleeting moment and a memorable scene. The importance of relevant background music is also becoming increasingly evident in user-generated content across digital platforms. The crux of the challenge is to select background music that complements the narrative, intensifies emotions, and captivates the audience. However, this selection process predominantly remains a laborious manual task and often lacks uniqueness, with creators having to sift through countless tracks, finding music that fits the mood and tone, while also being distinctive. Artificial Intelligence (AI) is a technology that can achieve a personalized solution, and can achieve this solution faster and more cost-effective.

However, with AI generated background music largely uncharted, only a handful of models are available, each with its unique attributes and limitations. V2Meow is a multi-stage autoregressive model that surpasses prior systems in visual-audio alignment. See K. Su, J. Y. Li, Q. Huang, D. Kuzmin, J. Lee, C. Donahue, F. Sha, A. Jansen, Y. Wang, M. Verzetti, et al., "V2meow: Meowing to the visual beat via music generation," arXiv preprint arXiv:2305.06594, 2023. The model neglects any dialogue in the video. Also, while it allows for style control via text prompts, producing such low-level descriptions of music might necessitate a nuanced understanding of compositions. Similarly, V-MusProd utilizes music priors and video-music relations and uses three progressive transformer stages to generate full-length background music for general videos. See L. Zhuo, Z. Wang, B. Wang, Y. Liao, S. Peng, C. Bao, M. Lu, X. Li, and S. Liu, "Video background music generation: Dataset, method and evaluation," arXiv preprint arXiv:2211.11248, 2022. Despite its merits, the emphasis is on video content, ignoring dialogues, and the MIDI format does not capture the depth of raw audio. Built on a transformer-based architecture, controllable music transformer (CMT) uses rhythmic relations between videos and background music and offers genre and instrument controls. See S. Di, Z. Jiang, S. Liu, Z. Wang, L. Zhu, Z. He, H. Liu, and S. Yan, "Video background music generation with controllable music transformer," 2021, ACM. A dual linear transformers-based model that neglects sentiment and restricts music representation to MIDI has been proposed. See X. Yang, Y. Yu, and X. Wu, "Double linear transformer for background music generation from videos," Applied Sciences, vol. 12, pp. 5050, 05 2022. Some of these models heavily rely on video features like color changes for music generation, which can impact their performance with black-and-white videos. Specialized music generation models for performance-based videos also exist, but their domains do not align with movie scenes and are thus tangential.

Though machine learning has ventured into the domain of automated music generation for films, its scope has been limited. This is partly because generating fitting music pieces from visual scenes is a difficult problem. In addition, existing models neglect spoken dialogues and emotional subtext, focus mainly on low-level music synchronization issues, and restrict music representation to MIDI.

Accordingly, it is one object of the present disclosure to provide systems and methods for integrating both speech and visual aspects of diverse scenes, perform sentiment analysis to identify the nuanced emotional undertone of key-frames, and leverage raw audio to enrich output background music quality.

SUMMARY

An aspect is a method of generating background music tailored for a movie scene, in a smart audio-visual display device, that can include receiving, from an input source, a video of the movie scene; detecting, by processing circuitry, speech signals in the movie scene; extracting, by the processing circuitry, visual information and, when speech signals are detected, spoken dialogue from the movie scene; generating, by the processing circuitry, descriptive text from the visual information; detecting, by the processing circuitry, emotion categories based on the visual information; transcribing, by the processing circuitry, the spoken dialogue into transcribed text; translating, via a large language model (LLM) by the processing circuitry, the descriptive text, emotion categories and transcribed text into text-based musical instrument conditions; guiding, by the musical instrument conditions, a text-to-music model in the processing circuitry, to generate audio tokens that resonate with the movie scene; and outputting, by the audio-visual display device, music signals in accordance with the audio tokens in synchronism with the movie scene.

In a further aspect a non-transitory computer-readable storage medium including computer executable instructions, wherein the instructions, when executed by a computer, cause the computer to perform a method for generating background music tailored for a movie scene, in a smart audio-visual display device, the method can include receiving, from an input source, a video of the movie scene; detecting, by processing circuitry, speech signals in the movie scene; extracting, by the processing circuitry, visual information and, when speech signals are detected, spoken dialogue from the movie scene; generating, by the processing circuitry, descriptive text from the visual information; detecting, by the processing circuitry, emotion categories based on the visual information; transcribing, by the processing circuitry, the spoken dialogue into transcribed text; translating, via a large language model (LLM) by the processing circuitry, the descriptive text, emotion categories and transcribed text into text-based musical instrument conditions; guiding, by the musical instrument conditions, a text-to-music model in the processing circuitry, to generate audio tokens that resonate with the movie scene; and outputting, by the audio-visual display device, music signals in accordance with the audio tokens in synchronism with the movie scene.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 5A-5E are example display screens of outputs resulting from the music generation pipeline for a movie scene for The Lion King movie, in accordance with an exemplary aspect of the disclosure;

FIGS. 6A-6E are example display screens of outputs resulting from the music generation pipeline for a movie scene for The Titanic movie, in accordance with an exemplary aspect of the disclosure;

FIGS. 7A-7E are example display screens of outputs resulting from the music generation pipeline for a movie scene for The Social Network movie, in accordance with an exemplary aspect of the disclosure;

FIGS. 8A-8E are example display screens of outputs resulting from the music generation pipeline for a movie scene for The Troy movie, in accordance with an exemplary aspect of the disclosure;

FIGS. 9A-9E are example display screens of outputs resulting from the music generation pipeline for a movie scene for The Grand Budapest Hotel movie, in accordance with an exemplary aspect of the disclosure;

FIGS. 10A-10E are example display screens of outputs resulting from the music generation pipeline for a movie scene for The Royal Tenenbaums movie, in accordance with an exemplary aspect of the disclosure;

FIGS. 11A-11E are example display screens of outputs resulting from the music generation pipeline for a movie scene for The Pursuit of Happiness movie, in accordance with an exemplary aspect of the disclosure;

FIGS. 12A-12E are example display screens of outputs resulting from the music generation pipeline for a movie scene for The Manna Mia! movie, in accordance with an exemplary aspect of the disclosure;

DETAILED DESCRIPTION

Figure 1:
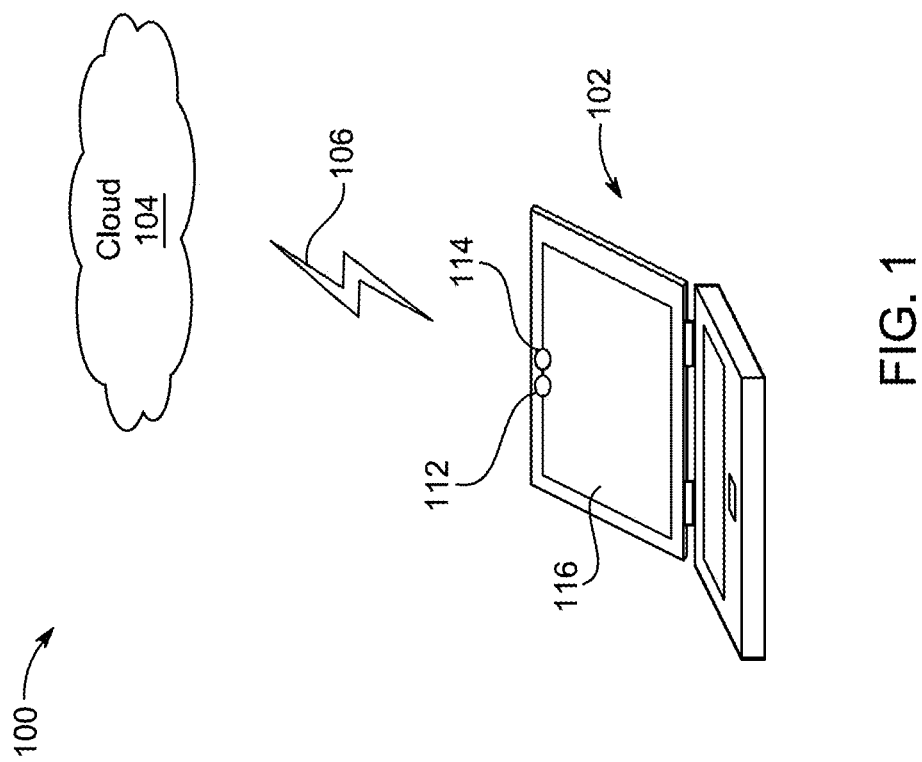
FIG. 1 is a diagram for a system for cinematic music generation through text processing.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for integrating a suite of machine learning models to understand movie scenes and subsequently generate fitting background music. An aspect is vision and speech models that extract visual information and spoken dialogue from a movie scene. The audio and video streams run concurrently in a pipeline. Emotion analysis is also performed on key frames. Resulting high-level insights are then translated into low-level text-based music conditions using a Large Language Model (LLM). Finally, LLM prompts are fed into a text-to-music model to generate relevant music.

FIG. 1 is a diagram for a system for cinematic background music generation. The system integrates both speech and visual aspects of diverse scenes, and performs sentiment analysis to identify the nuanced emotional undertone of key-frames. As such, the system requires processing capability for audio, video, text, and music signals. The system 100 includes a computing device 102, which could include a laptop computer, tablet computer, desktop computer, and can also include smart TVs. Smart TVs are optimized for audio-visual and music. The computing device 102 may include a connection 106 to an external system, such as a cloud service 104. The computing device 102 includes one or more camera units 114, and may include a microphone 112. Internal components of the computing device 102 should include video and speech output processing circuitry. As such, the computing device 102 includes processing circuitry for audio-visual and speech signals. The computing device 102 may include communication circuitry for high speed communication with external devices as well as the cloud service.

Figure 2:
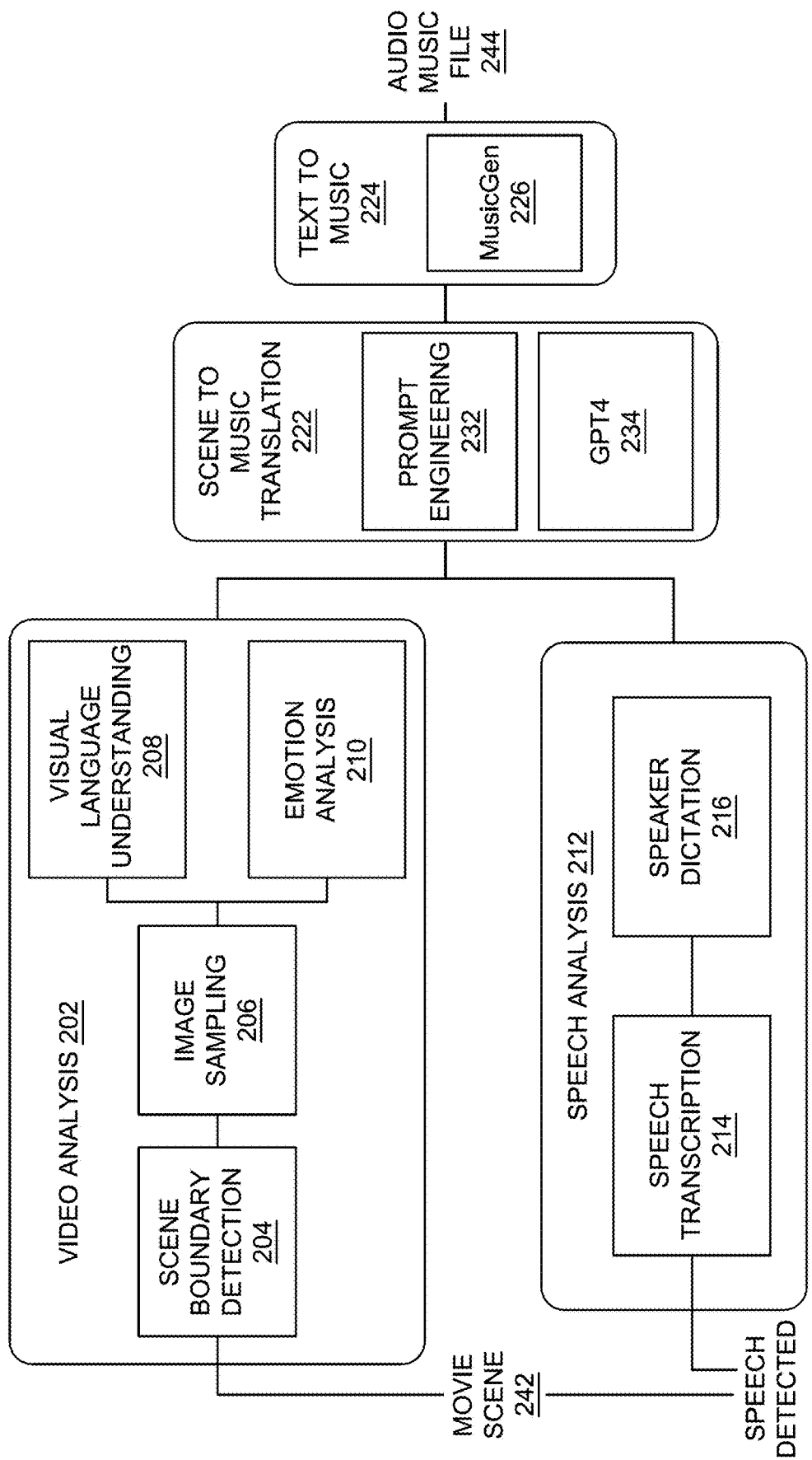
FIG. 2 is a diagram of a machine learning-based music generation pipeline, in accordance with an exemplary aspect of the disclosure.

FIG. 2 is a diagram of a machine learning-based music generation pipeline. The music generation pipeline takes a movie scene 242 as input and generates a tailored audio music file 244.

Video Analysis 202

Scene Boundary Detection & Image Sampling: Scene boundary detection involves identifying and temporally localizing sub-scene boundaries, which are points where significant changes in a scene occur. In the pipeline, images are sampled from every sub-scene, providing a comprehensive representation regardless of its length. Various approaches for this task may be considered, including pixel-based methods, histograms, Otsu's method, edge-based techniques, etc. See B. Reddy and A. Jadhav, "Comparison of scene change detection algorithms for videos," in *IEEE ACCT*, 2015, pp. 84-89, incorporated herein by reference in its entirety.

PySceneDetect is employed for efficient scene boundary detection 104. PySceneDetect is a tool for detecting shot changes in videos, and can automatically split a video into separate clips. PySceneDetect has several detection methods to find fast-cuts and threshold-based fades. FFmpeg is software project consisting of a suite of libraries and programs for handling video, audio, and other multimedia files and streams.

PySceneDetect is employed to detect hue, saturation, and value (HSV) color space shifts for scene transitions and ffmpeg is utilized for determining scene cuts. After identifying the scenes, in 106 a frame sampling algorithm functions as follows: for scenarios with fewer than n detected scenes, a minimum of n images are sampled across them; when there are n or more scenes, one image is sampled from each scene. It has been determined that given the high processing demands of the downstream multimodal image captioning and sentiment detection stages, over-sampling at this stage could adversely affect subsequent performance. As a solution, a value of n=15 was found to be an optimal balance between capturing sufficient scene detail and maintaining a manageable computational load. Also, tests have been performed that confirm the superiority of a sampling method over uniform sampling.

Visual Language Understanding: A Visual Language Understanding 108 component decodes static photos and videos using natural language. Conventionally, vision-text tasks involved captioning, retrieval, and question-answering. Both videotext and image-text models utilize text and visual encoders. Encoder-decoder models generate outputs post multimodal fusion, while encoder-only models directly harness cross-modal representations. Recent innovations like CLIP and ALIGN, arising from large-scale Visual Language Pretraining (VLP), have spurred advanced multimodal models like SimVLM and Florence. See A. Radford, J. W. Kim, C. Hallacy, A. Ramesh, G. Goh, S. Agarwal, G. Sastry, A. Askell, P. Mishkin, J. Clark, G. Krueger, and I. Sutskever, "Learning transferable visual models from natural language supervision," 2021; and C. Jia, Y. Yang, Y. Xia, Y-T. Chen, Z. Parekh, H. Pham, Q. V. Le, Y. Sung, Z. Li, and T. Duerig, "Scaling up visual and vision-language representation learning with noisy text supervision," 2021, each incorporated herein by reference in their entirety.

In assessing both video and image captioning models, outcomes are observed: PDVC and BMT yielded inconsistent video captions, VidSUM3 is subtitle dependent, and DSNet's video summarization had mixed outcomes. See T. Wang, R. Zhang, Z. Lu, F. Zheng, R. Cheng, and P. Luo, "End-to-end dense video captioning with parallel decoding," 2021; V. Iashin and E. Rahtu, "A better use of audio-visual cues: Dense video captioning with bi-modal transformer," 2020; and W. Zhu, J. Lu, J. Li, and J. Zhou, "Dsnet: A flexible detect-to-summarize network for video summarization," *IEEE Transactions on Image Processing*, vol. 30, pp. 948-962, 2021, each incorporated herein by reference in their entirety. Among image captioning models, GIT, BLIP, and CLIP presented challenges in capturing scene context. BLIP2 and CoCa showed promising results in producing accurate and descriptive captions. See J. Wang, Z. Yang, X. Hu, L. Li, K. Lin, Z. Gan, Z. Liu, C. Liu, and L. Wang, "Git: A generative image-to-text transformer for vision and language," 2022; J. Li, D. Li, C. Xiong, and S. Hoi, "Blip: Bootstrapping language-image pre-training for unified vision-language understanding and generation," 2022; Radford et al.; J. Li, D. Li, S. Savarese, and S. Hoi, "Blip-2: Bootstrapping language-image pre-training with frozen image encoders and large language models," 2023; and J. Yu, Z. Wang, V. Vasudevan, L. Yeung, M. Seyedhosseini, and Y. Wu, "Coca: Contrastive captioners are image-text foundation models," 2022, each incorporated herein by reference in their entirety. In an embodiment, the visual language understanding component incorporates BLIP2, due to its performance and scalability on a test set.

BLIP-2 bridges a modality gap with a lightweight Querying Transformer, which is pretrained in two stages. The first stage bootstraps vision-language representation learning from a frozen image encoder. The first stage connects Querying Transformer (Q-Former) to a frozen image encoder and perform pre-training using image-text pairs. The first stage trains the Q-Former such that the queries can learn to extract visual representation that is most informative of the text.

The second stage in BLIP-2 bootstraps vision-to-language generative learning from a frozen language model. In the generative pre-training stage, the second stage connects Q-Former (with the frozen image encoder attached) to a frozen LLM to harvest the LLM's generative language capability. The second stage uses a fully-connected (FC) layer to linearly project the output query embeddings into the same dimension as the text embedding of the LLM. The projected query embeddings are then prepended to the input text embeddings. The text embeddings function as soft visual prompts that condition the LLM on visual representation extracted by the Q-Former.

Emotion Analysis: Discerning a scene's emotional undertone is pivotal for generating fitting background music. From classic techniques like KNN and SVM using wavelet energy features, emotion analysis 110 has advanced to modern methods like DNN, CNN, R-CNN, and Fast R-CNN. See N. Mittal, D. Sharma, and M. L. Joshi, "Image sentiment analysis using deep learning," in *IEEE/WIC/ACM International Conference on Web Intelligence*, 2018, pp. 684-687, incorporated herein by reference in its entirety. OpenAI's CLIP has proved to be very effective for emotion recognition within images, with robust performance on the CIFAR100 dataset. A discussion of emotion recognition within images is provided in A. Bondielli and L. C. Passaro, "Leveraging clip for image emotion recognition," in *CEUR WORKSHOP PROCEEDINGS*, 2021, vol. 3015, incorporated herein by reference in its entirety. In an embodiment, informed by emotional categories, CLIP is utilized, fine-tuned on emotion detection, in a zero-shot setting. Emotion categories related to music is discussed in A. S. Cowen, X. Fang, D. Sauter, and D. Keltner, "What music makes us feel: At least 13 dimensions organize subjective experiences associated with music across different cultures," *Proceedings of the National Academy of Sciences*, vol. 117, no. 4, pp. 1924-1934, 2020, incorporated herein by reference in its entirety.

Notably, to employ the CLIP model for emotion classification, first generate a caption for each label in the dataset. In one example, the employed caption is "a photo of a <label>", where <label> is one of the 100 labels of the dataset. For one dataset, the caption may be "an image that evokes the emotion of <emotion>", where <emotion> is one of the eight emotion labels.

Speech Analysis 112

Speech Transcription: Speech Transcription component 114 converts scene speech dialogues into text. It has been determined that the analysis of verbal content in videos can enhance understanding of scenes. An intriguing development in this domain is Whisper2, which uses an encoder-decoder Transformer that trains directly on raw transcripts, eliminating the need for complex data standardization steps. A discussion of Whisper2 is provided in A. Radford, J. W. Kim, T. Xu, G. Brockman, C. McLeavey, and I. Sutskever, "Robust speech recognition via large-scale weak supervision," 2022, incorporated herein by reference in its entirety. In Whisper2, a sequence-to-sequence Transformer model is trained on many different speech processing tasks, including multilingual speech recognition, speech translation, spoken language identification, and voice activity detection. All of these tasks are jointly represented as a sequence of tokens to be predicted by the decoder, allowing for a single model to replace many different stages of a traditional speech processing pipeline.

In the present pipeline, the speech transcription component 214 can be implemented with Whisper2. The speech transcription component 214 can recognize diverse audio inputs including foreign language dialogues in scenes.

Speaker Diarization: Speaker diarization (or diarisation) is the process of partitioning an audio stream containing human speech into homogeneous segments according to the identity of each speaker. In other words, it can be used to identify the particular speaker that made the speech. In the present pipeline, diarization follows speech transcription, ensuring accurate attribution of the text to specific speakers. This process augments a main goal: generating contextually appropriate background music based on speaker dynamics in videos. Noteworthy toolkits include PyAnnote, based on YouTube recordings; NVIDIA NeMo, trained on telephone conversations; Simple Diarizer, with a more basic framework; SpeechBrain, a PyTorch-based AI toolkit; Kaldi, catering to researchers; UIS-RNN, Google's diarization model; FunASR, a PyTorch-based open-source toolkit; VBx, an xvector extractor for diarization. Commercial options also exist, like Google Recorder App, Amazon Transcribe, and IBM Watson Speech To Text API. See H. Bredin, R. Yin, J. M. Coria, G. Gelly, P. Korshunov, M. Lavechin, D. Fustes, H. Titeux, W. Bouaziz, and M. P. Gill, "pyannote.audio: neural building blocks for speaker diarization," in ICASSP, 2020, incorporated herein by reference in its entirety.

In a preferred embodiment, PyAnnote is used in the speaker diarization due to its efficiency, ease of integration, and adaptability. PyAnnote offers lightweight architecture and a hybrid speaker diarization method, meeting accuracy and computational efficiency demands. Its opensource nature also guarantees ongoing access.

Text Based Scene to Music Translation

Prompt Engineering 232 is the process of crafting a contextually rich, informative prompt that can guide a model's output in the desired direction. The approach to Vision Language Understanding, Emotion Analysis, and Audio Transcription and Diarization generates high-level descriptions of the input movie scene. Through prompt engineering 232, a LLM 234 translates these high-level descriptions into text-based, low-level music conditions.

High-Level Video Descriptions: An input prompt is designed to encapsulate key frame captions, speech transcriptions, and emotional nuances. This provides LLM 234 with a high-level description of the video's context through text. For instance, in the famous I'm Flying scene from Titanic, where Rose and Jack share a defining, passionate moment at the ship's bow, the high-level video descriptions are: Image captions: 1) A man and woman standing on the deck of a boat at sunset . . . 19) A woman looking into the eyes of a man. 20) A man and a woman are looking at each other. 21) A man and a woman standing next to each other . . . Audio transcriptions: . . . Speaker 00: Give me your hand. Speaker 00: Now close your eyes. Speaker 00: Go on. Speaker 00: Step up. Speaker 00: Now hold on to the railing. Video sentiments: Romantic (100%)

Text Based Low-Level Music Conditions: LLM 134 translates the above high-level video descriptions into low-level output that describes in detail what the relevant background music for the scene should sound like. For example, the high-level descriptions from the Titanic scene generated the following music conditions: Ethereal orchestral piece with soft piano undertones, interlaced with melancholic violin solos, reminiscent of historical romance. Very gentle harp plucks accentuate moments of intimacy, crescendos mirroring the ebb and flow of the sea . . . . Capturing the essence of timeless romance and the breathtaking moments of connection between two souls. Subtle choral harmonies emerge, giving depth and warmth, encapsulating the nostalgia and longing found in epic tales of love. These text-based music conditions then serve as an input prompt for the subsequent text-to-music model. Sample prompts and generated music can be found at: audiomatic-research.github.io/herrmann-1/.

In an embodiment, OpenAI's GPT-4 can be used as the LLM 234, renowned for its advanced language comprehension and generation. GPT-4 is described in OpenAI, "Gpt-4 technical report," 2023, incorporated herein by reference in its entirety. GPT-4 is a Transformer based model pre-trained to predict the next token in a document, a technique referred to as causal model learning. GPT-4 uses a multimodal architecture. It consists of three main components: an encoder that transforms image and text inputs into vector representations; a decoder that generates text outputs from vector representations; and an attention mechanism that allows a coder and decoder to focus on relevant parts of the inputs and outputs.

However, it should be noted that the LLM 234 is not limited to GPT-4 and may be any large-scale, language model which can accept at least textual inputs and produce textual outputs.

Figure 3:
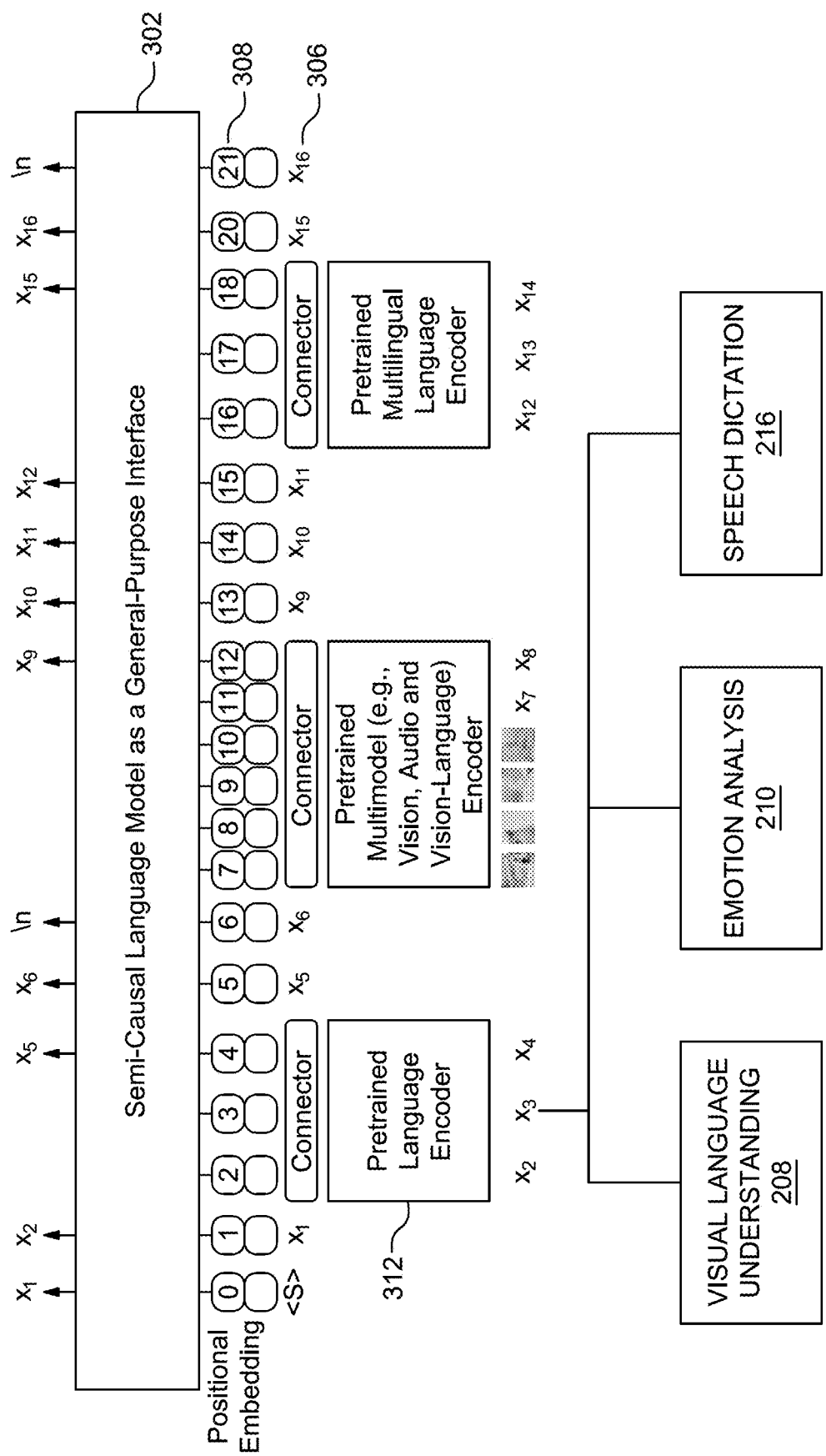
FIG. 3 illustrates the architecture for MetaLM for a LLM.

FIG. 3 illustrates an architecture for the LLM based on a possible model used for GPT-4. In a transformer model, such as GPT-4, a backbone of the model is a Transformer-based causal language model. As noted above, a causal language model is a type of language model that predicts the next token in a sequence based on the previous tokens. Apart from text, other modalities may be embedded and fed into the language model. A Transformer decoder 302 may serve as a general-purpose interface to multimodal input.

The training approach can use a model to learn the relationship between text and other modalities. An image modality may have multiple embeddings 308 (e.g., positional locations 7-12 in FIG. 3) which are passed through the transformer. During training, only the embedding predicted after seeing all the image embeddings (e.g. ×9 in FIG. 3) is used to calculate a loss.

Training is performed by fine-tuning the pre-trained GPT-4. The training file for GPT-4 consists of high-level descriptions of a movie scene including an image caption, an audio transcription, and emotional nuances. The GPT-4 is trained to output specific low-level music conditions in detail.

A GPT-4 model is fine tuned using a training data file, organized in a file format, preferably, a JSONL format. To use GPT-4, there must be a openai account, which is used to generate an API token. The API token can be set as an environment variable. The training data file can then be uploaded to the OpenAI server. A fine-tuned GPT-4 model is created using the training data file. OpenAI provides training metrics to determine if the training is progressing as expected. When the model is successfully trained, the fine-tuned model may be used by way of an API call to obtain a response, i.e., low-level music conditions.

In an example implementation, the inputs included in the training data file are formatted as an input prompt. As in FIGS. 5A, 5B, 5C, described below, an example prompt is:

Image Captions From a Video 1) the sun is setting behind a tree in the dark 2) the sun is setting over the horizon in the X distance 3) the sun is setting over the horizon in the distance 4) the lion king wallpapers the lion king wallpapers the lion king wallpapers the lion king wallpapers the lion king wallpapers the lion king wallpapers 5) the lion king, lion king, lion king 2, lion king 2 wallpaper, lion king wallpaper, lion king wallpaper hd wallpaper 6) a rhinoceros is standing in the grass with an orange sky in the background 7) the lion king, lion king, lion king 2, lion king 2 wallpaper, lion king 2 wallpaper, lion king 2 wallpaper hd wallpaper 8) Disney's the lion king the lion, the witch and the Wardrobe 9) the lion king the lion king the lion king the lion king the lion king the lion king the lion king the lion king the lion king 10) a group of meerkats standing on top of a hill 11) the lion king the lion king the lion king the lion king the lion king the lion king the lion king the lion king the lion king the lion king 12) a lion stands on top of a hill with an orange sky in the background 13) a painting of two storks standing in the water 14) an animated image of a large bird standing on the water 15) an animated image of a bird sitting on a branch 16) a painting of two birds flying over a body of water 17) an animated image of a large bird flying over a body of water 18) a waterfall with birds flying over it at sunset 19) a black background with an airplane flying in the air 20) a black background with an airplane flying in the air.

Audio Transcriptions

1) Naaan simpwenyaa mabaghi ti baba (SPEAKER_00) 2) Si ji ko mou (SPEAKER_00) 3) Venyaa mabogh (SPEAKER_00) 4) Venyaa mabogh (SPEAKER_00) 5) Naaan simpwenyaa mabaghi ti baba (SPEAKER_02) 6) Si ji ko mou (SPEAKER_01) 7) Venyaa mabogh (SPEAKER_01) 8) Hai baba (SPEAKER_01) 9) Venyaa mabogh (SPEAKER_01) 10) Si yo mou baba (SPEAKER_03) 11) Venyaa mabogh (SPEAKER_03) 12) Venyaa mabogh (SPEAKER_03).

Emotional Nuances: the sentiments of the video are: calm 46.67% sad 33.33% inspiring 20.00%

Output: Describe the music that would fit such a video. The output is fed to a text to music model 224. Other outputs can include: Give me only the description of the music without any explanation. Give me a single description.

In training a large language model, there is need of a sequence of same-length vectors that are generated from text and images. For text, this is straightforward since the tokens are already discretized. In an embodiment, a Transformer decoder 302 perceives input text in a unified way. For input format, the input is flattened as a sequence decorated with special tokens. Specifically, in one embodiment, a model uses <s> and </s> to denote start and end-of-sequence. Special tokens such as <descriptive text> and </descriptive text> can indicate the beginning and end of encoded descriptive text for image embeddings. For example, "<s> document </s>" is a text input, and "<s> paragraph <descriptive text> Image Embedding </descriptive text> paragraph </s>" is an interleaved image caption-text input. In one embodiment, a model uses a variety of special tokens such as <emotion category> and </emotion category> to indicate the an encoded emotion category, <speech> and </speech> to indicate transcribed speech. In an embodiment, special tokens such as <speaker> and </speaker> to indicate a speaker that makes the speech. An embedding module may be used to encode both text tokens and other input modalities into vectors. Then the embeddings are fed into the decoder. The left-to-right causal model processes the sequence in an auto-regressive manner, which produces the next token by conditioning on past timesteps.

The LLM 234 may include a language encoder. A pretrained language encoder 312 generates embeddings that are passed through a connector layer 306.

Text-to-Music Generation

Text-to-music generation 224 transforms rich textual outputs from the LLM 234 into music via specialized text-to-music models. Recent research in this domain has been vibrant; notable models include ERNIE-Music, MusicLM, Noise2Music, MuseCoco, and MusicGen. See Zhu, Pengfei, Chao Pang, Yekun Chai, Lei Li, Shuohuan Wang, Yu Sun, Hao Tian, and Hua Wu. "Ernie-music: Text-to-waveform music generation with diffusion models." arXiv preprint arXiv:2302.04456 (2023); Agostinelli, Andrea, Timo I. Denk, Zalán Borsos, Jesse Engel, Mauro Verzetti, Antoine Caillon, Qingqing Huang et al. "Musiclm: Generating music from text." arXiv preprint arXiv:2301.11325 (2023); Huang, Qingqing, Daniel S. Park, Tao Wang, Timo I. Denk, Andy Ly, Nanxin Chen, Zhengdong Zhang et al. "Noise2music: Text-conditioned music generation with diffusion models." arXiv preprint arXiv:2302.03917 (2023); Lu, Peiling, Xin Xu, Chenfei Kang, Botao Yu, Chengyi Xing, Xu Tan, and Jiang Bian. "Musecoco: Generating symbolic music from text." arXiv preprint arXiv:2306.00110 (2023), each incorporated herein by reference in their entirety.

In an embodiment, MusicGen 226 is used for the pipeline. It transposes textual inputs into music tokens, offering robust control over the generated output music. MusicGen 226 is a single Language Model (LM) that operates over several streams of compressed discrete music representation, i.e., tokens. Unlike prior work, MusicGen is comprised of a single-stage transformer LM together with efficient token interleaving patterns, which eliminates the need for cascading several models, e.g., hierarchically or upsampling. MusicGen avoids the complexities of multi-model cascading. Its capability to produce high-quality audio music, conditioned on textual features, aligns with an objective to mirror video content's emotion and narrative. The public availability of the model supports further fine-tuning of the model.

Evaluation

Dataset: To evaluate the efficacy of the model of the present disclosure, an internal test set is curated comprising movie scenes from YouTube.

Objective Metrics

Kullback-Leiber Divergence (KLD): Due to a many-to-many relationship between input videos and generated music, a direct waveform comparison between original and generated music isn't sensible. Instead, KLD is used. See J. Copet, F. Kreuk, I. Gat, T. Remez, D. Kant, G. Synnaeve, Y. Adi, and A. D'efossez, "Simple and controllable music generation," 2023, incorporated herein by reference in its entirety. Mathematically, KLD between two probability distributions P and Q is given by:

$$D_{KL}(P\|Q) = \sum_{x} P(x)\log\frac{P(x)}{Q(x)} \qquad (1)$$

A LEAF classifier is employed pre-trained on AudioSet to obtain class predictions for both sets of music. See Zeghidour, Neil, Olivier Teboul, Félix De Chaumont Quitry, and Marco Tagliasacchi. "LEAF: A learnable frontend for audio classification." arXiv preprint arXiv:2101.08596 (2021), incorporated herein by reference in its entirety.

Table 1 presents the KLD scores for our method and CMT's method using their publicly available code-base4. A lower KLD score for the model suggests a higher similarity between the distributions of original music and music generated by the model.

Fréchet Audio Distance (FAD): FAD scores serve as an indicator of audio quality and resonate with how humans perceive sound. See Kilgour, Kevin, Mauricio Zuluaga, Dominik Roblek, and Matthew Sharifi. "Fréchet audio distance: A metric for evaluating music enhancement algorithms." arXiv preprint arXiv:1812.08466 (2018), incorporated herein by reference in its entirety.

The FAD score between two multivariate Gaussians $\mathcal{N}_{b\,b}(\mu_b, \Sigma_b)$ and $\mathcal{N}_{e\,e}(\mu_e, \Sigma_e)$ is given by:

$$F(\mathcal{N}_b, \mathcal{N}_e) = \|\mu_b - \mu_e\|^2 + tr\left(\sum\nolimits_{b} + \sum\nolimits_{e} - 2\sqrt{\sum\nolimits_{b}\sum\nolimits_{e}}\right) \qquad (2)$$

Models with low FAD scores tend to produce more credible audio outputs. To calculate FAD scores, the VGGish audio embeddings is leveraged. See S. Hershey, S. Chaudhuri, D. P. W. Ellis, J. F. Gemmeke, A. Jansen, C. Moore, M. Plakal, D. Platt, R. A. Saurous, B. Seybold, M. Slaney, R. Weiss, and K. Wilson, "Cnn architectures for large-scale audio classification," in ICASSP, 2017, incorporated herein by reference in its entirety. As the MusicCaps dataset isn't tailored for cinematic music, calculating FAD scores against it wasn't directly applicable. To address this, collect a dedicated, 15-hour-long, high-quality, cinematic music dataset. The FAD scores for the pipeline, the original tracks, and the music generated by CMT are shown in Table 1. A lower FAD score for our model indicates the capability of our method to better capture the auditory characteristics of movie music.

TABLE 1

Summary of results for objective evaluation.

| Method | KLD Score | FAD Score |
| --- | --- | --- |
| Original Tracks | 0.00 | 2.78 |
| Present Method | 0.73 | 4.85 |
| CMT | 1.93 | 13.58 |

Subjective Assessment

Study Design: Besides objective measurements, a subjective survey is conducted to evaluate the performance of the music generation pipeline. Similar to the method followed by Yang et al., each subject reviewed three versions of five movie scenes: one with the original soundtrack; another with the model-generated music; and a third with a random track from a mixed dataset of human and machine-produced music serving as a baseline. See Yang, Ruihan, Dingsu Wang, Ziyu Wang, Tianyao Chen, Junyan Jiang, and Gus Xia. "Deep music analogy via latent representation disentanglement." arXiv preprint arXiv:1906.03626 (2019), incorporated herein by reference in its entirety.

All scenes had the same duration (30 seconds). A total of 120 subjects participated in the survey, including 10 professional musicians. The order in which scenes appeared was randomized to prevent bias, and participants were unaware of the music's source. The subjects were asked to rate each sample on a 5-point scale from 1 (very low) to 5 (very high) according to the following criteria:

- Relevance: Perceived appropriateness of the background music to the video's contents.
- Quality: Assessment of overall music quality, including detection of any musical anomalies.

Figure 4:
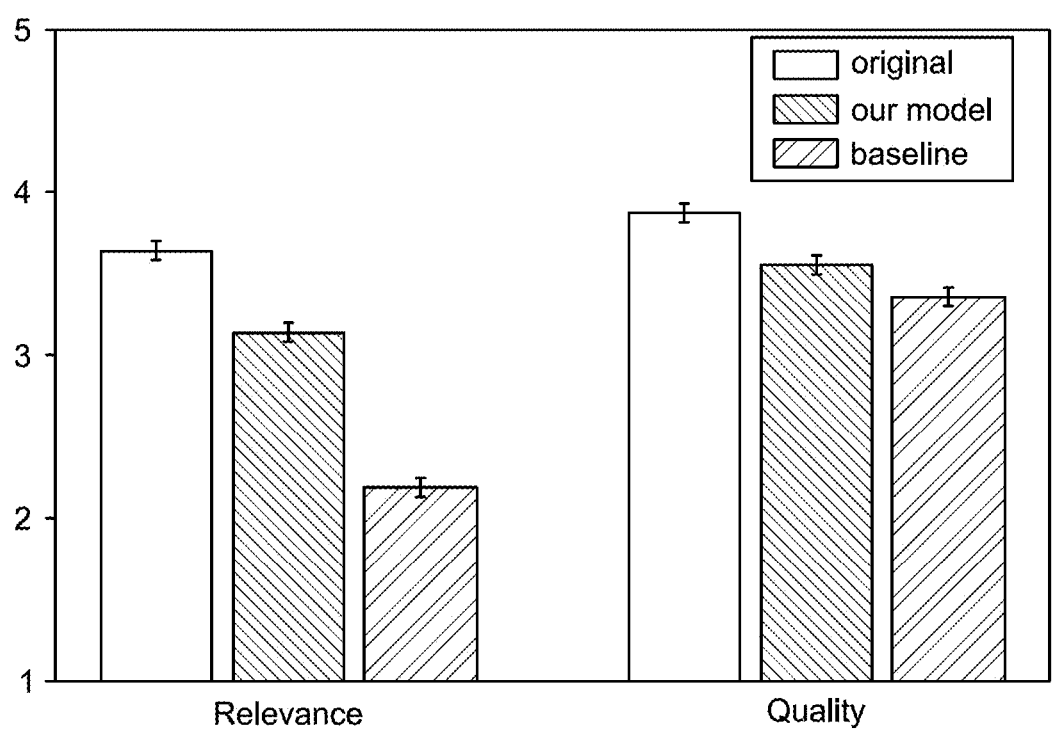
FIG. 4 is a chart of subjective evaluation results computed using within-subject ANOVA, in accordance with an exemplary aspect of the disclosure.

FIG. 4 presents the results of a qualitative evaluation. The y-axis represents average ratings and the error bars indicate the Standard Deviation computed using within-subject ANOVA. See H. Scheffe, *The Analysis of Variance*, vol. 72, John Wiley & Sons, 1999, incorporated herein by reference in its entirety. The disclosed model outperformed the random music baseline in terms of relevance and quality, with statistical significance ($p<0.05$). The method's relevance ratings were comparable to the original compositions.

As mentioned above, LLM 234 translates the above high-level video descriptions into low-level output that describes in detail what the relevant background music for the scene should sound like. Text-to-music generation 224 transforms rich textual outputs from GPT-4 234 into music.

Various examples are provided to exhibit high-level video descriptions, low-level output, and a resulting video with generated background music. The high-level video descriptions include text from the visual language understanding component 208, output from emotion analysis component 210, output from speaker dictation component 216, and prompts from prompt engineering 232. The low-level text is output from the LLM 234. The music 244 generated from MusicGen 226 can be output in synchronism with the original video as the background music.

Figure 5E:
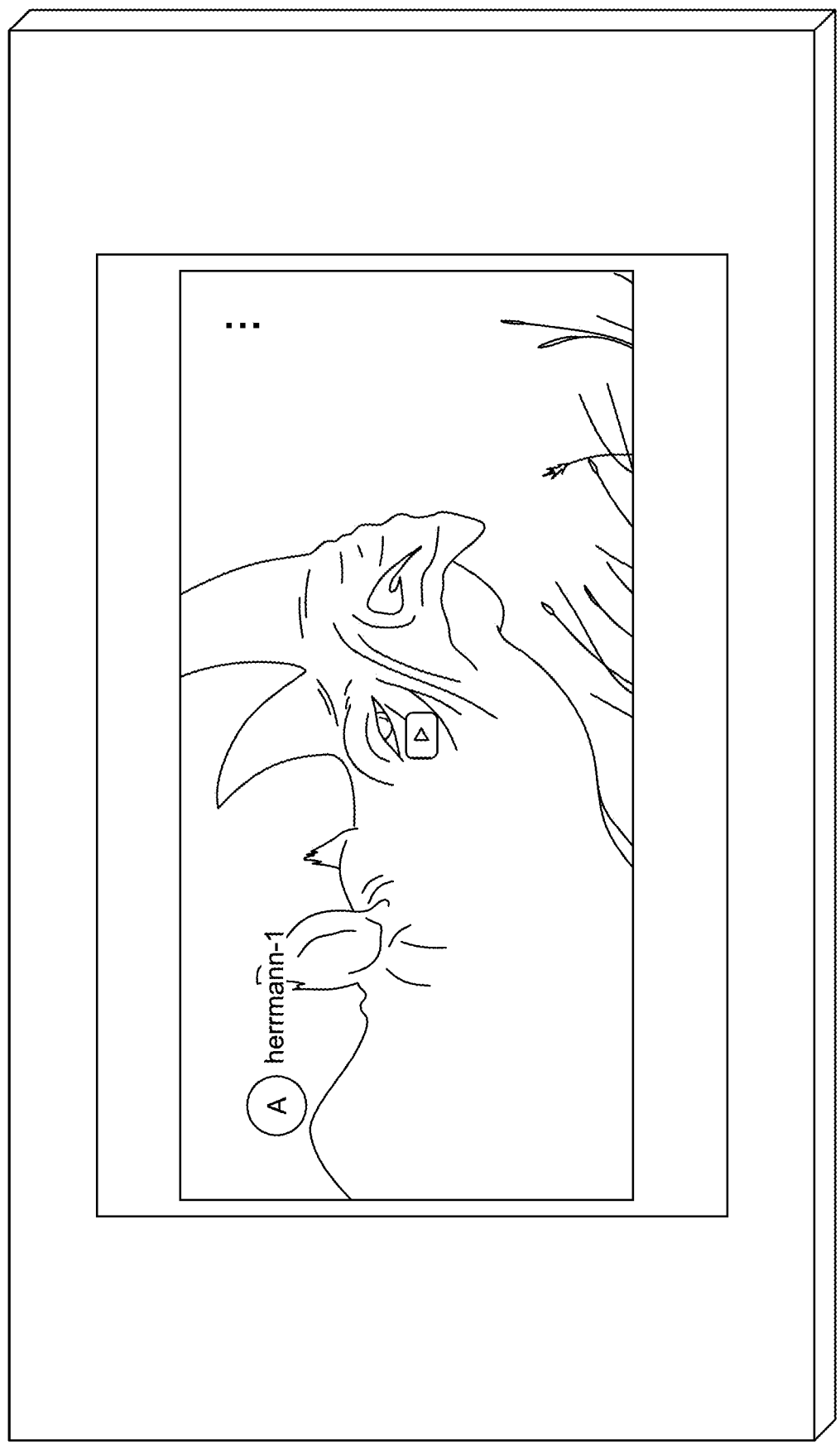

FIGS. 5A-5E are example display screens of outputs resulting from the music generation pipeline for a movie scene for The Lion King movie. FIG. 5A illustrates text for 20 captions as high-level video descriptions. FIG. 5B illustrates text transcriptions identified by speaker, and identified sentiments. FIG. 5C illustrates text for example prompts for music that may match the video. FIG. 5D illustrates a low-level text music description. FIG. 5E is an example display for a start screen for a movie scene that includes background music generated based on the low-level text description.

Figure 6E:
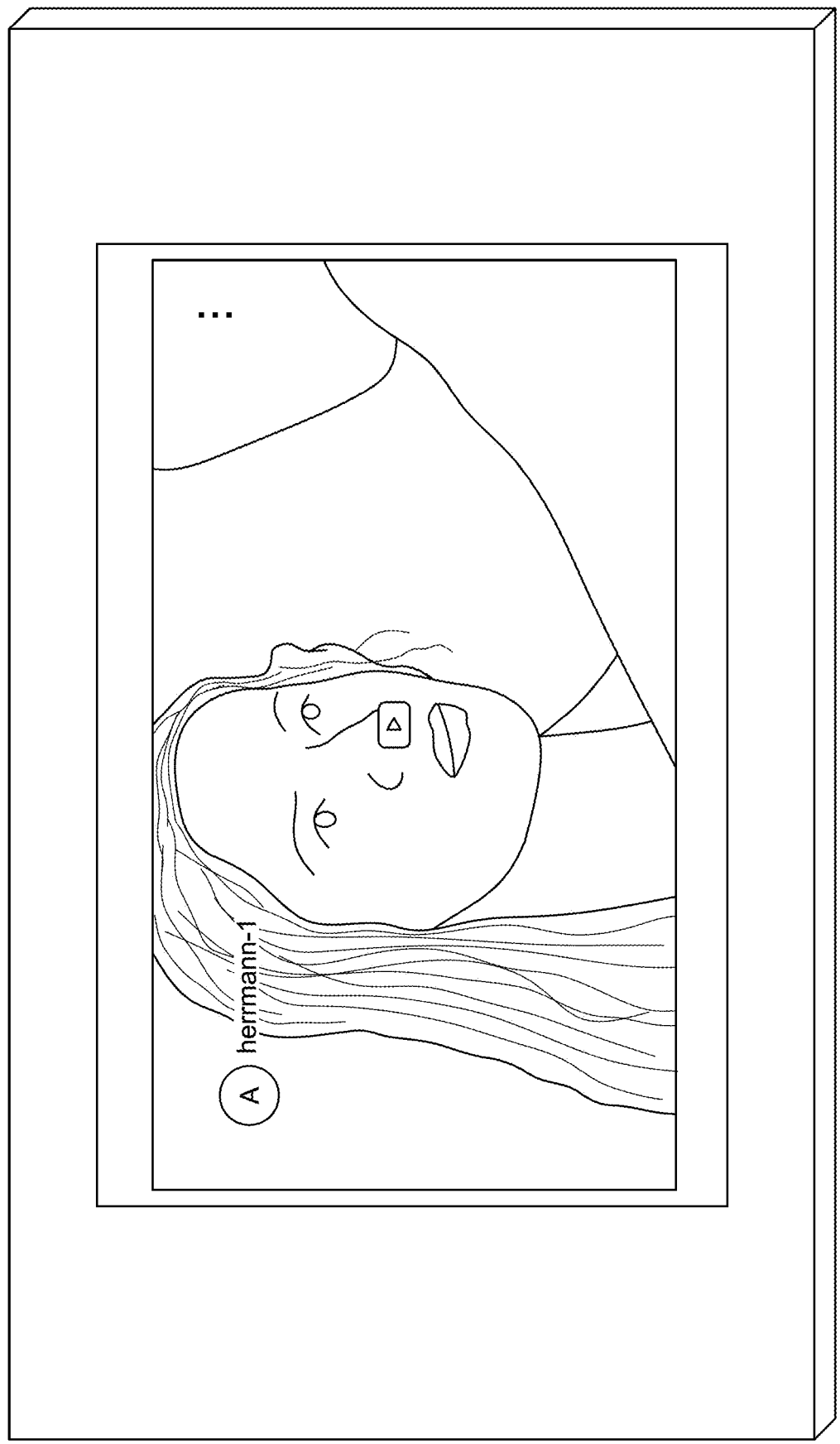

FIGS. 6A-6E are example display screens of outputs resulting from the music generation pipeline for a movie scene for The Titanic movie. FIG. 6A illustrates text for 22 captions as high-level video descriptions. FIG. 6B illustrates text transcriptions identified by speaker and identified sentiment. FIG. 6C illustrates text for example prompts for music that may match the video. FIG. 6D illustrates a low-level text music description. FIG. 6E is an example display for a start screen for a movie scene that includes background music generated based on the low-level text description.

Figure 7D:
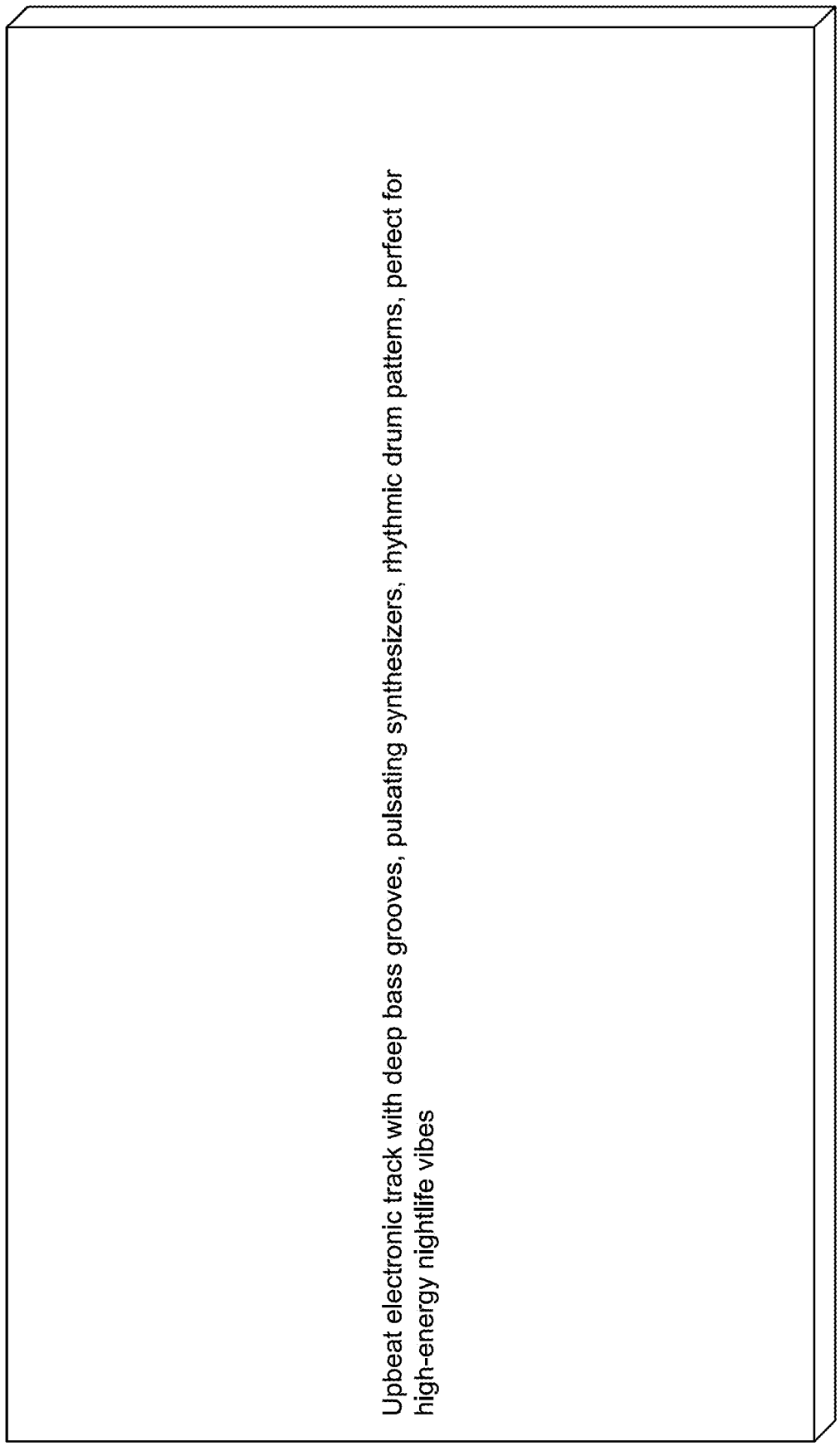
Figure 7E:
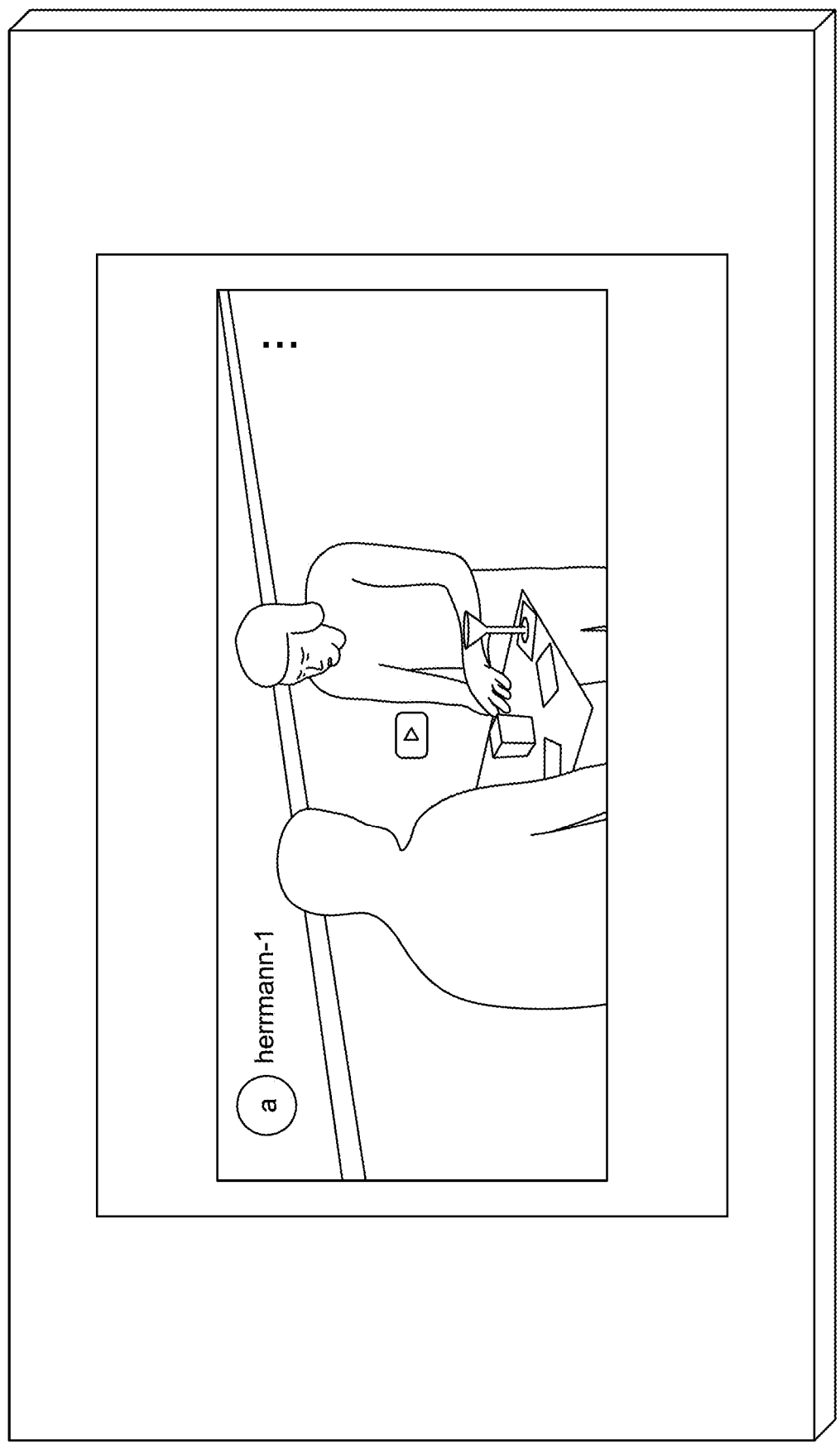

FIGS. 7A-7E are example display screens of outputs resulting from the music generation pipeline for a movie scene for The Social Network movie. FIG. 7A illustrates text for 12 captions as high-level video descriptions. FIG. 7B illustrates text transcriptions identified by speaker and identified sentiment. FIG. 7C illustrates text for example prompts for music that may match the video. FIG. 7D illustrates a low-level text music description. FIG. 7E is an example display for a start screen for a movie scene that includes background music generated based on the low-level text description.

Figure 8D:
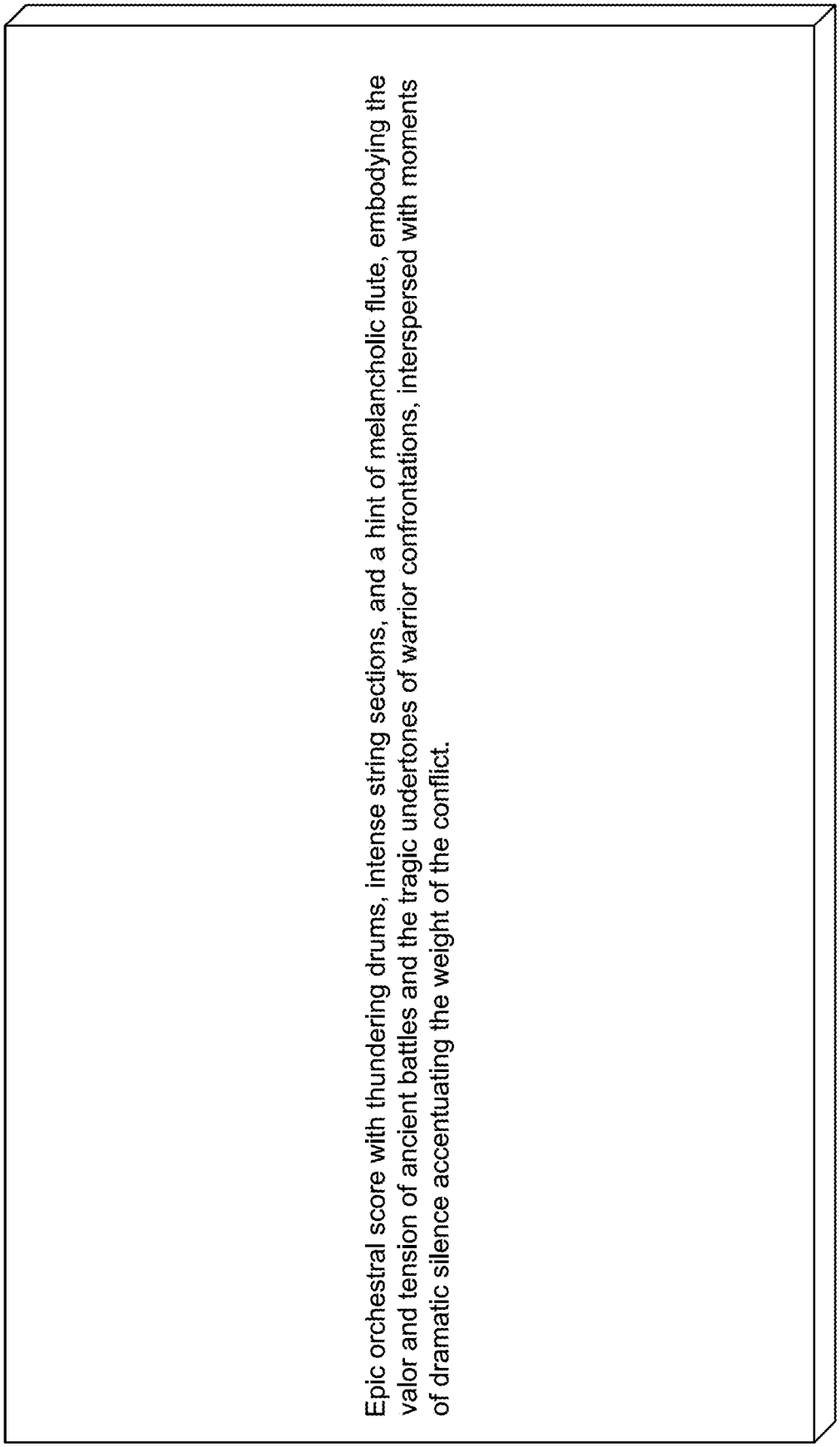
Figure 8E:
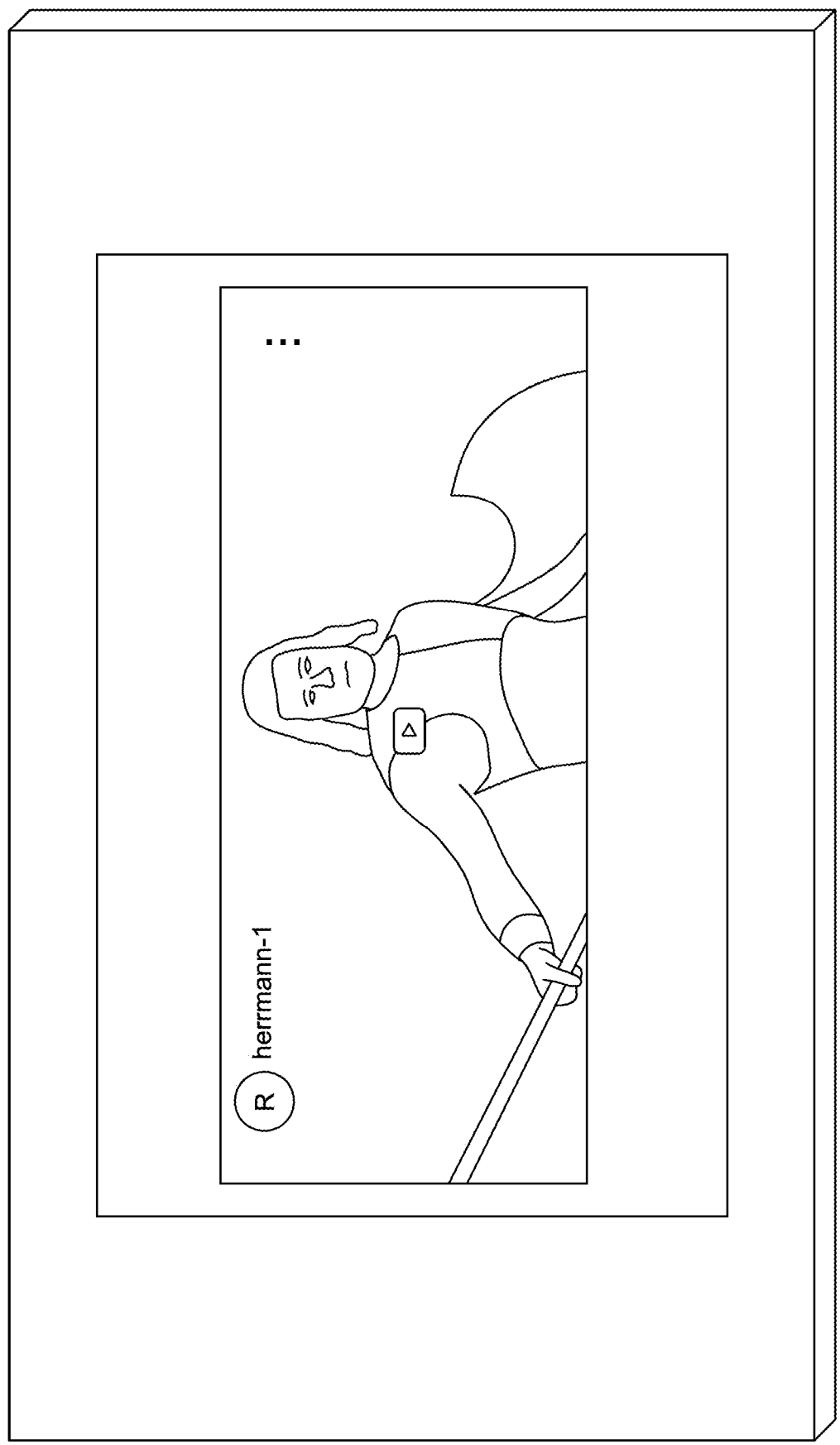

FIGS. 8A-8E are example display screens of outputs resulting from the music generation pipeline for a movie scene for The Troy movie. FIG. 8A illustrates text for 25 captions as high-level video descriptions. FIG. 8B illustrates text transcriptions identified by speaker and identified sentiment. FIG. 8C illustrates text for example prompts for music that may match the video. FIG. 8D illustrates a low-level text music description. FIG. 8E is an example display for a start screen for a movie scene that includes background music generated based on the low-level text description.

Figure 9E:
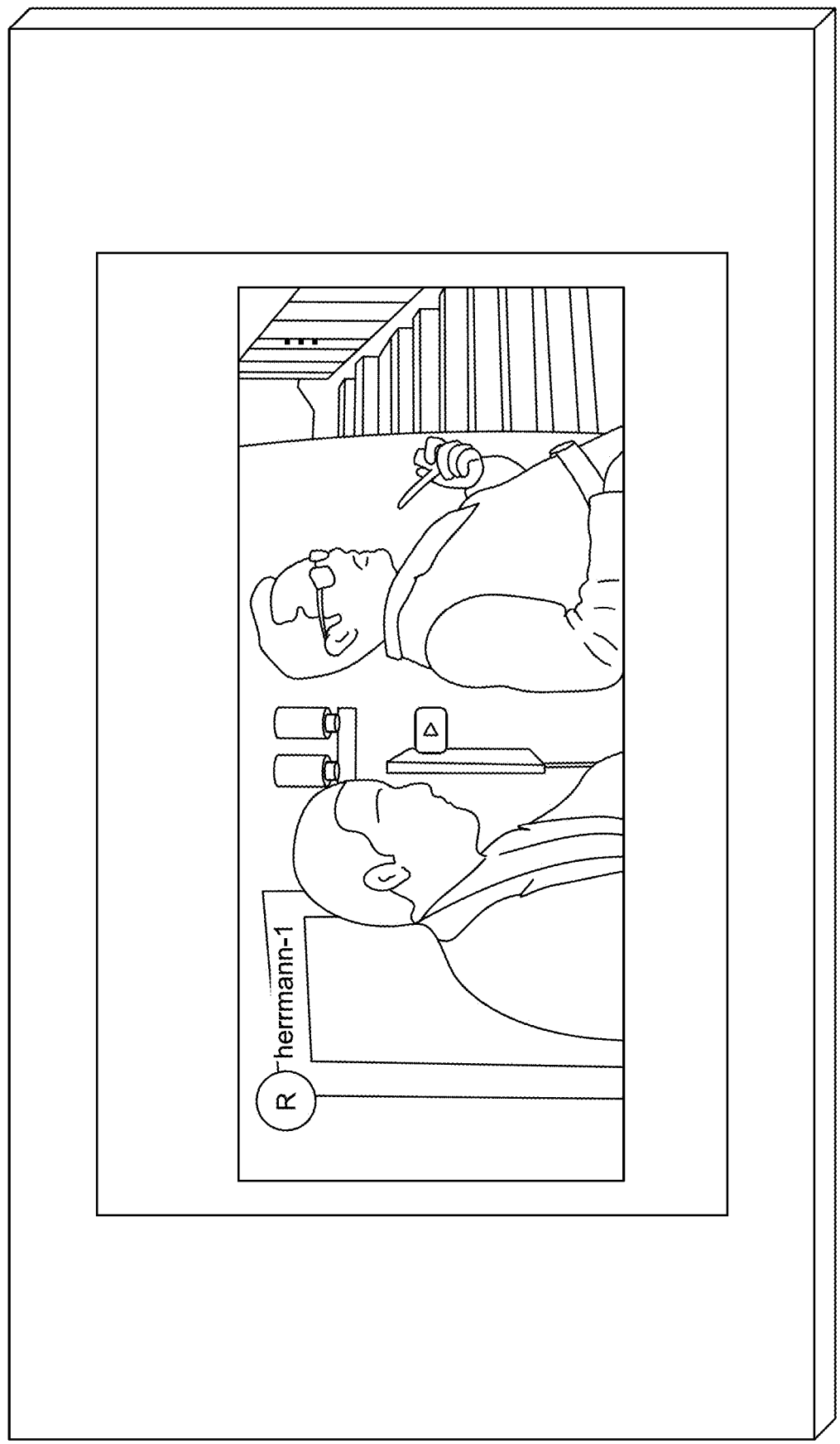

FIGS. 9A-9E are example display screens of outputs resulting from the music generation pipeline for a movie scene for The Grand Budapest Hotel movie. FIG. 9A illustrates text for 27 captions as high-level video descriptions. FIG. 9B illustrates text transcriptions identified by speaker and identified sentiment. FIG. 9C illustrates text for example prompts for music that may match the video. FIG. 9D illustrates a low-level text music description. FIG. 9E is an example display for a start screen for a movie scene that includes background music generated based on the low-level text description.

Figure 10E:
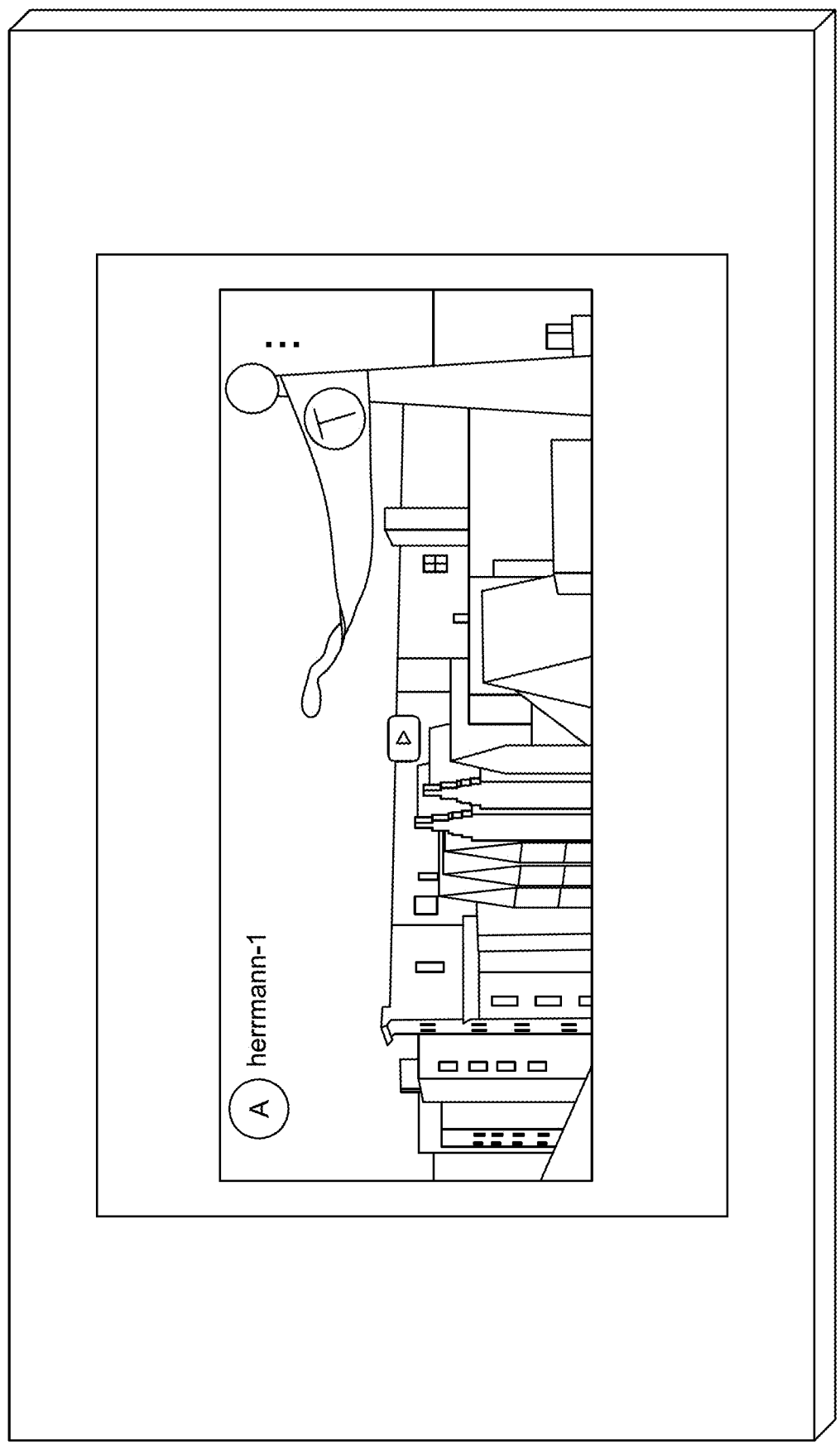

FIGS. 10A-10E are example display screens of outputs resulting from the music generation pipeline for a movie scene for The Royal Tenenbaums movie. FIG. 10A illustrates text for 21 captions as high-level video descriptions. FIG. 10B illustrates text transcriptions identified by speaker and identified sentiment. FIG. 10C illustrates text for example prompts for music that may match the video. FIG. 10D illustrates a low-level text music description. FIG. 10E is an example display for a start screen for a movie scene that includes background music generated based on the low-level text description.

Figure 11E:
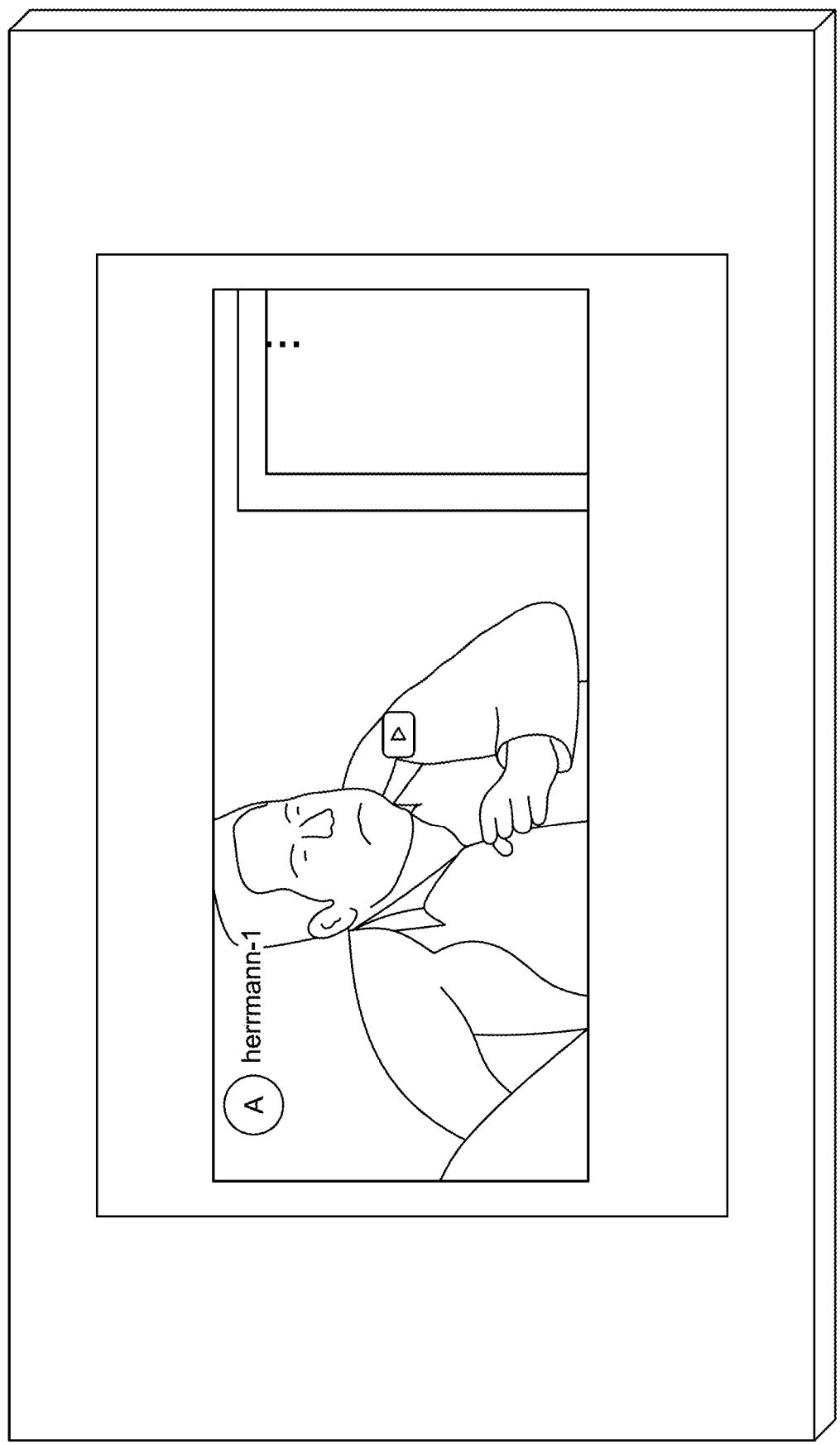

FIGS. 11A-11E are example display screens of outputs resulting from the music generation pipeline for a movie scene for The Pursuit of Happiness movie. FIG. 11A illustrates text for 37 captions as high-level video descriptions. FIG. 11B illustrates text transcriptions identified by speaker and identified sentiment. FIG. 11C illustrates text for example prompts for music that may match the video. FIG. 11D illustrates a low-level text music description. FIG. 11E is an example display for a start screen for a movie scene that includes background music generated based on the low-level text description.

Figure 12E:
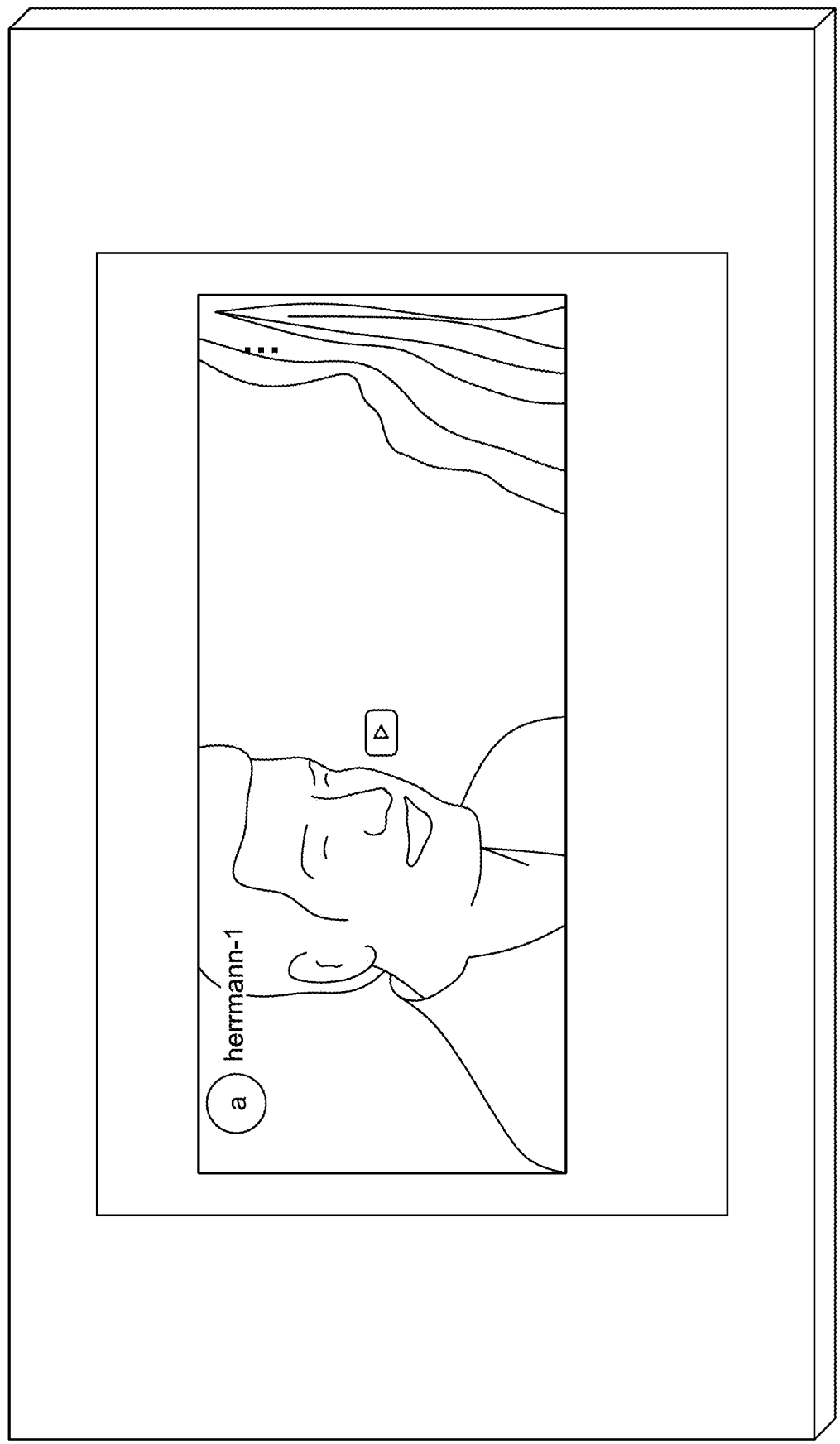

FIGS. 12A-12E are example display screens of outputs resulting from the music generation pipeline for a movie scene for The Manna Mia! Movie. FIG. 12A illustrates text for 36 captions as high-level video descriptions. FIG. 12B illustrates text transcriptions identified by speaker and identified sentiment. FIG. 12C illustrates text for example prompts for music that may match the video. FIG. 12D illustrates a low-level text music description. FIG. 12E is an example display for a start screen for a movie scene that includes background music generated based on the low-level text description.

Next are details of the hardware description of the computing environment for performing the above-described pipeline according to exemplary embodiments is described with reference to FIG. 13.

Figure 13:
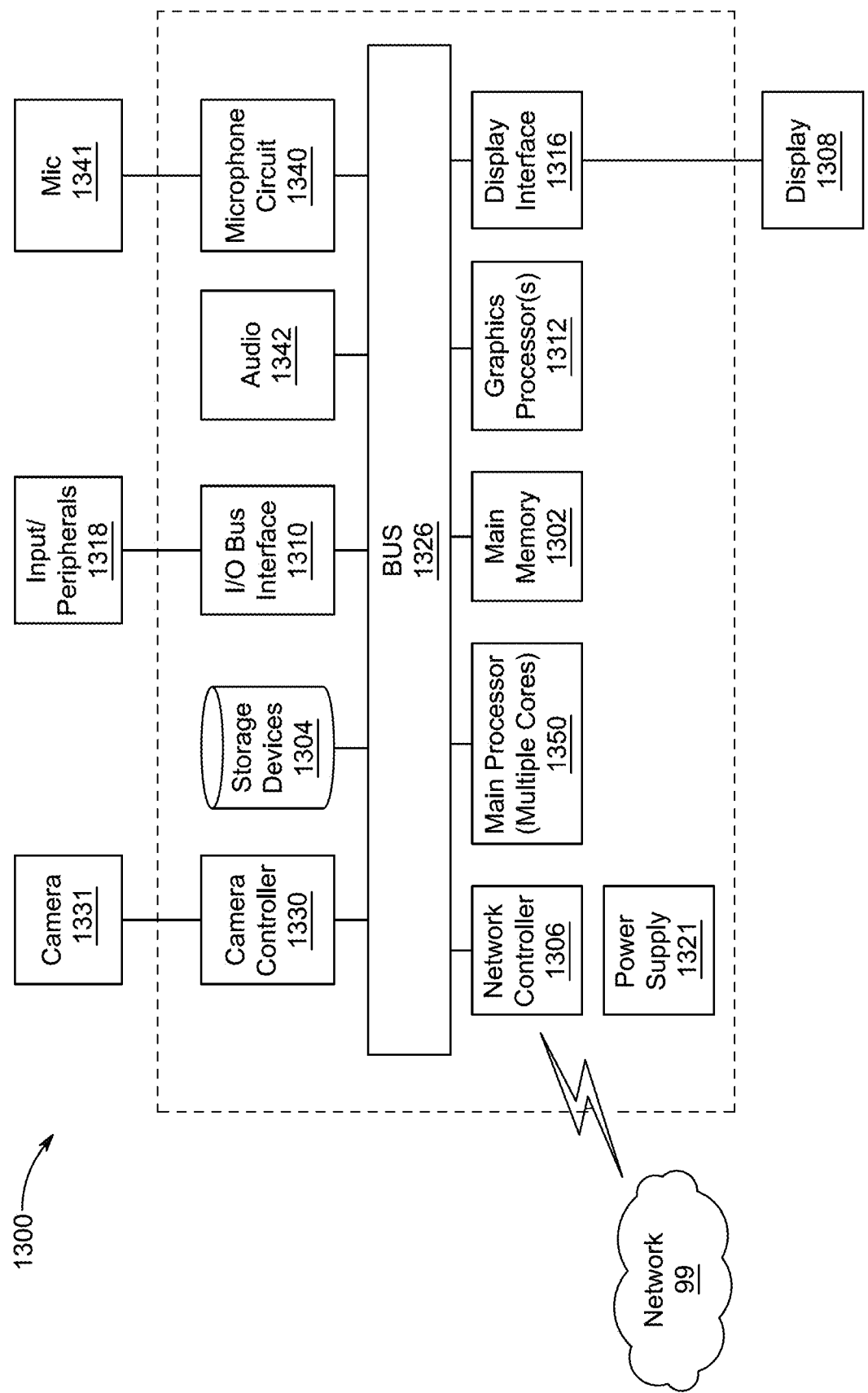
FIG. 13 is an illustration of a non-limiting example of details of computing hardware used in the computing system, according to certain embodiments.

FIG. 13 is a block diagram illustrating an exemplary smart display system for implementing the machine learning training and inference methods according to an exemplary aspect of the disclosure. The smart display system may be a laptop computer or smart television. The smart display system includes an operating system, for example a Linux OS, Windows, a version of Unix OS, or Mac OS. The smart display system 1300 may include one or more central processing units (CPU) 1350 having multiple cores. The smart display system 1300 may include a graphics board 1312 having multiple GPUs, each GPU having GPU memory. The graphics board 1312 may perform many of the mathematical operations of the disclosed machine learning methods. The smart display system 1300 includes main memory 1302, typically random access memory RAM, which contains the software being executed by the processing cores 1350 and GPUs 1312, as well as a non-volatile storage device 1304 for storing data and the software programs. Several interfaces for interacting with the computer system 1300 may be provided, including an I/O Bus Interface 1310, Input/Peripherals 1318 such as a keyboard, touch pad, mouse, Display Adapter 1316 and one or more Displays 1308, and a Network Controller 1306 to enable wired or wireless communication through a network 99. The interfaces, memory and processors may communicate over the system bus 1326. The smart display system 1300 includes a power supply 1321, which may be a redundant power supply.

The smart display system 1300 may have extra audio-video components besides the display 1308. The extra audio-video components can include a camera 1331 for image/video capture with a camera controller circuit 1330, an audio circuit 1342 for outputting audio signals, and a microphone 1341 for inputting speech and sound signals with a microphone circuit 1340. The microphone circuit 1340 can be configured with one or more filters, such as a noise canceling filter and/or other signal processing circuitry.

In some embodiments, the smart display system 1300 may include a server CPU and a graphics card by NVIDIA, in which the GPUs have multiple CUDA cores. In some embodiments, the smart display system 1300 may include a machine learning engine 1312.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of generating background music tailored for a movie scene, in a smart audio-visual display device, comprising:
    receiving, from an input source, a video of the movie scene;
    detecting, by processing circuitry, speech signals in the movie scene;

extracting, by the processing circuitry, visual information and, when speech signals are detected, spoken dialogue from the movie scene;

generating, by the processing circuitry, descriptive text from the visual information;

detecting, by the processing circuitry, emotion categories based on the visual information;

transcribing, by the processing circuitry, the spoken dialogue into transcribed text;

translating, via a large language model (LLM) by the processing circuitry, the descriptive text, emotion categories and transcribed text into text-based musical instrument conditions;

guiding, by the musical instrument conditions, a text-to-music model in the processing circuitry, to generate audio tokens that resonate with the movie scene; and outputting, by the audio-visual display device, music signals in accordance with the audio tokens in synchronism with the movie scene.

2. The method of claim 1, wherein the extracted visual information is sent to a video processing stream and the speech signals are sent to a separate audio stream which run concurrently.

3. The method of claim 2, wherein the transcribing step is performed concurrently with the generating step and step of detecting emotion categories.

4. The method of claim 1, wherein the step of generating descriptive text from the visual information includes detecting, by the processing circuitry, sub-scene boundaries and identifying and temporally localizing the sub-scene boundaries to denote sub-scenes;

frame sampling, by the processing circuitry, where at least one image is sampled from each sub-scene; and visual language understanding, by the processing circuitry, to produce descriptive captions for the detected sub-scenes using the sampled frames.

5. The method of claim 4, wherein the step of frame sampling includes, sampling a number n of images relative to a number s of sub-scenes.

6. The method of claim 5, wherein the step of frame sampling further includes, sampling one image from each sub-scene when the number s is greater than or equal to 15, and sampling a number n of 15 images when there are fewer than 15 sub-scenes.

7. The method of claim 4, wherein the step of detecting emotion categories includes:

recognizing the emotion categories, via a machine language model fine-tuned on emotion detection, within the detected sub-scenes.

8. The method of claim 7, wherein the recognizing the emotion categories is performed on key frames within the detected sub-scenes.

9. The method of claim 1, further comprising performing, by the processing circuitry, speaker diarization on the transcribed text and labeling the transcribed text with a label for each detected speaker.

10. The method of claim 3, wherein the step of translating includes:

combining, by the processing circuitry, the descriptive text, emotion categories, transcribed text, and diarization labels to generate a high-level description of the movie scene, and guiding the LLM, by contextually rich prompts, to translate the high-level descriptions into the text-based low-level musical instrument conditions.

11. A non-transitory computer-readable storage medium including computer executable instructions, wherein the instructions, when executed by a computer, cause the computer to perform a method for generating background music tailored for a movie scene, in a smart audio-visual display device, the method comprising:

receiving, from an input source, a video of the movie scene;

detecting, by processing circuitry, speech signals in the movie scene;

extracting, by the processing circuitry, visual information and, when speech signals are detected, spoken dialogue from the movie scene;

generating, by the processing circuitry, descriptive text from the visual information;

detecting, by the processing circuitry, emotion categories based on the visual information;

transcribing, by the processing circuitry, the spoken dialogue into transcribed text;

translating, via a large language model (LLM) by the processing circuitry, the descriptive text, emotion categories and transcribed text into text-based musical instrument conditions;

guiding, by the musical instrument conditions, a text-to-music model in the processing circuitry, to generate audio tokens that resonate with the movie scene; and outputting, by the audio-visual display device, music signals in accordance with the audio tokens in synchronism with the movie scene.

12. The computer-readable storage medium of claim 11, wherein the extracted visual information is sent to a video processing stream and the speech signals are sent to a separate audio stream which run concurrently.

13. The computer-readable storage medium of claim 12, wherein the transcribing step is performed concurrently with the generating step and step of detecting emotion categories.

14. The computer-readable storage medium of claim 11, wherein the step of generating descriptive text from the visual information includes detecting, by the processing circuitry, sub-scene boundaries and identifying and temporally localizing the sub-scene boundaries to denote sub-scenes;

frame sampling, by the processing circuitry, where at least one image is sampled from each sub-scene; and visual language understanding, by the processing circuitry, to produce descriptive captions for the detected sub-scenes using the sampled frames.

15. The computer-readable storage medium of claim 14, wherein the step of frame sampling includes, sampling a number n of images relative to a number s of sub-scenes.

16. The computer-readable storage medium of claim 15, wherein the step of frame sampling further includes, sampling one image from each sub-scene when the number s is greater than or equal to 15, and sampling a number n of 15 images when there are fewer than 15 sub-scenes.

17. The computer-readable storage medium of claim 14, wherein the step of detecting emotion categories includes:

recognizing the emotion categories, via a machine language model fine-tuned on emotion detection, within the detected sub-scenes.

18. The computer-readable storage medium of claim 17, wherein the recognizing the emotion categories is performed on key frames within the detected sub-scenes.

19. The computer-readable storage medium of claim 11, further comprising performing, by the processing circuitry, speaker diarization on the transcribed text and labeling the transcribed text with a label for each detected speaker.

20. The computer-readable storage medium of claim 13, wherein the step of translating includes:

combining, by the processing circuitry, the descriptive text, emotion categories, transcribed text, and diarization labels to generate a high-level description of the movie scene, and guiding the LLM, by contextually rich prompts, to translate the high-level descriptions into the text-based low-level musical instrument conditions.

\* \* \* \* \*